(12) United States Patent  (10) Patent No.: US 7,857,454 B2
Mastrosimone-Gese et al.  (45) Date of Patent: Dec. 28, 2010

(54) IMAGE PROJECTING DEVICE

(75) Inventors: Mary G. Mastrosimone-Gese, East Aurora, NY (US); Gerald A. May, Colden, NY (US); David G. Waples, Orchard Park, NY (US)

(73) Assignee: Mattel, Inc., El Segundo, CA (US)

( * ) Notice: Subject to any disclaimer, the term of this patent is extended or adjusted under 35 U.S.C. 154(b) by 1032 days.

(21) Appl. No.: 11/609,982

(22) Filed: Dec. 13, 2006

(65) Prior Publication Data

US 2008/0143966 A1 Jun. 19, 2008

(51) Int. Cl.
G03B 21/14 (2006.01)

(52) U.S. Cl. .......................... 353/15; 353/85; 353/108; 40/367; 40/701

(58) Field of Classification Search .................. 353/15, 353/19, 30, 35, 39, 43, 62, 94, 403, 407, 353/408, 409, 120, 27 R; 40/362, 366, 367, 40/456, 474, 701
See application file for complete search history.

(56) References Cited

U.S. PATENT DOCUMENTS

| | | | |
|---|---|---|---|
| 2,301,274 A | 11/1942 | Greiser | |
| 2,307,981 A * | 1/1943 | Boon et al. | 353/9 |
| 3,100,420 A | 8/1963 | Kuhn | |
| 3,298,277 A | 1/1967 | Scharf | |
| 4,474,440 A | 10/1984 | Kramer et al. | |
| 4,482,328 A | 11/1984 | Ferguson et al. | |
| 4,756,614 A | 7/1988 | Kato et al. | |
| 4,758,485 A * | 7/1988 | Drexler | 430/12 |
| 4,765,734 A | 8/1988 | Truc et al. | |
| 5,266,980 A | 11/1993 | Gussin et al. | |
| 5,311,226 A | 5/1994 | Karasawa | |
| 5,311,356 A * | 5/1994 | Freilich | 359/467 |

(Continued)

FOREIGN PATENT DOCUMENTS

GB 2355080 A 4/2001

(Continued)

OTHER PUBLICATIONS

"3-D Space Projector" product website printout, www.speedydog.net/prod_3dspaceproj.html, dated May 16, 2007, 2 pages.

*Primary Examiner*—William C Dowling
(74) *Attorney, Agent, or Firm*—Edell, Shapiro & Finnan, LLC

(57) ABSTRACT

An image projection system includes an image projection device for projecting a light image onto a wall, ceiling or other designated surface. The image projection device includes a housing within which is disposed separately located light sources. The housing further includes a slot for receiving several image slides. Each image slide has multiple, separated, slide image patterns thereon and each slide image pattern is in a different location on the image slide. Each of the light sources is disposed in a light chamber such that light from one of the light sources projects through only one of the separated image patterns on the image slide. Light from light sources passing through respective slide image patterns can then intersect to project multiple superimposed images on an image viewing surface. Furthermore, an electronic controller controls the light intensity and light timing of each individual light source.

20 Claims, 21 Drawing Sheets

U.S. PATENT DOCUMENTS

| | | |
|---|---|---|
| 5,541,680 A | 7/1996 | Fromm |
| 5,545,072 A | 8/1996 | Arad et al. |
| 5,751,399 A * | 5/1998 | McIntyre et al. ............ 353/120 |
| 5,769,684 A * | 6/1998 | Lou ........................... 446/219 |
| 6,623,126 B2 * | 9/2003 | Sekiguchi et al. ............. 353/62 |
| 7,018,053 B2 | 3/2006 | Dwyer et al. |
| 2005/0012909 A1 | 1/2005 | Kokin et al. |
| 2005/0088631 A1 | 4/2005 | Dwyer et al. |
| 2005/0122487 A1 | 6/2005 | Koyama et al. |
| 2009/0273762 A1 * | 11/2009 | Ohira .......................... 353/62 |

FOREIGN PATENT DOCUMENTS

| | | |
|---|---|---|
| JP | 2004147703 | 5/2004 |

* cited by examiner

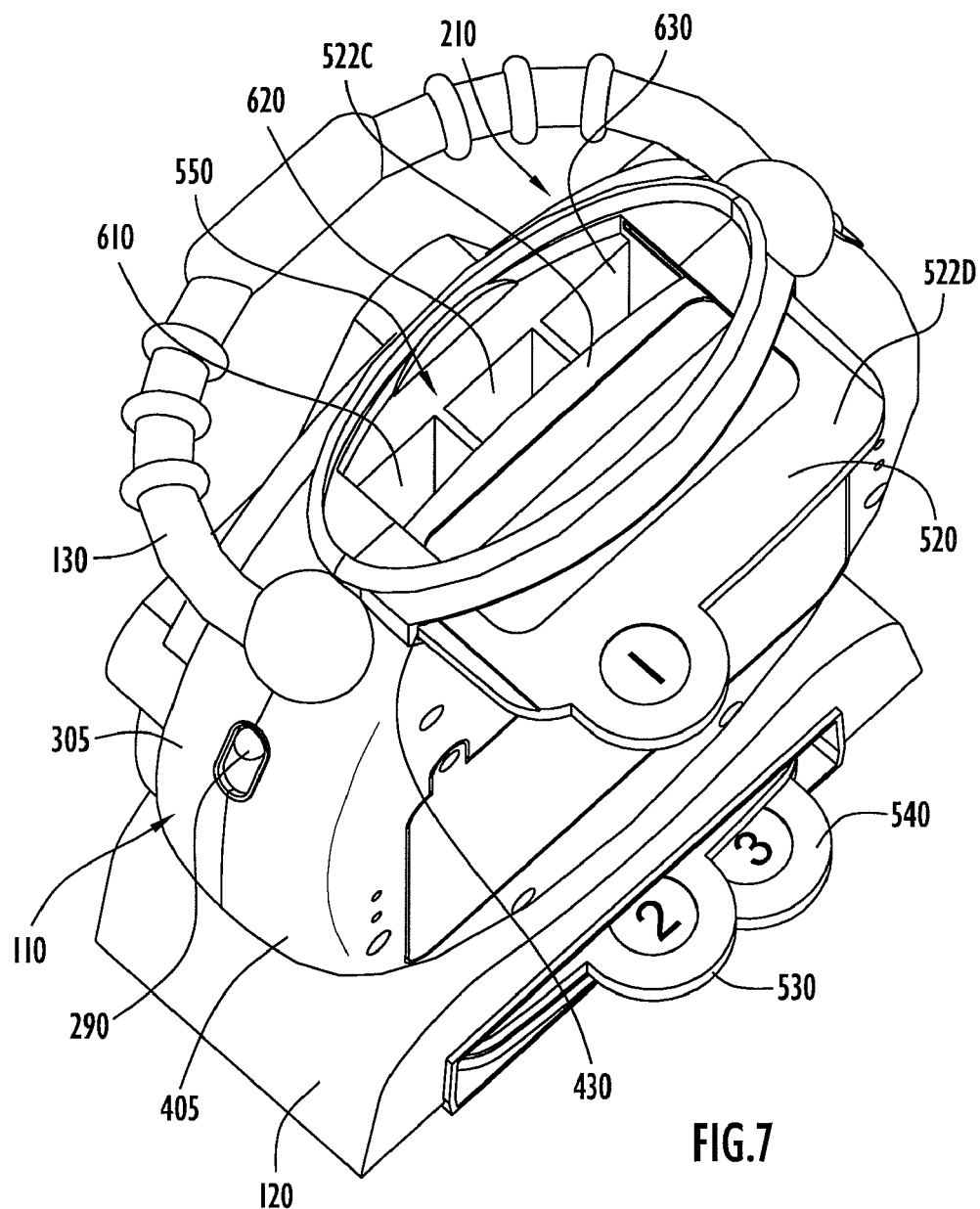

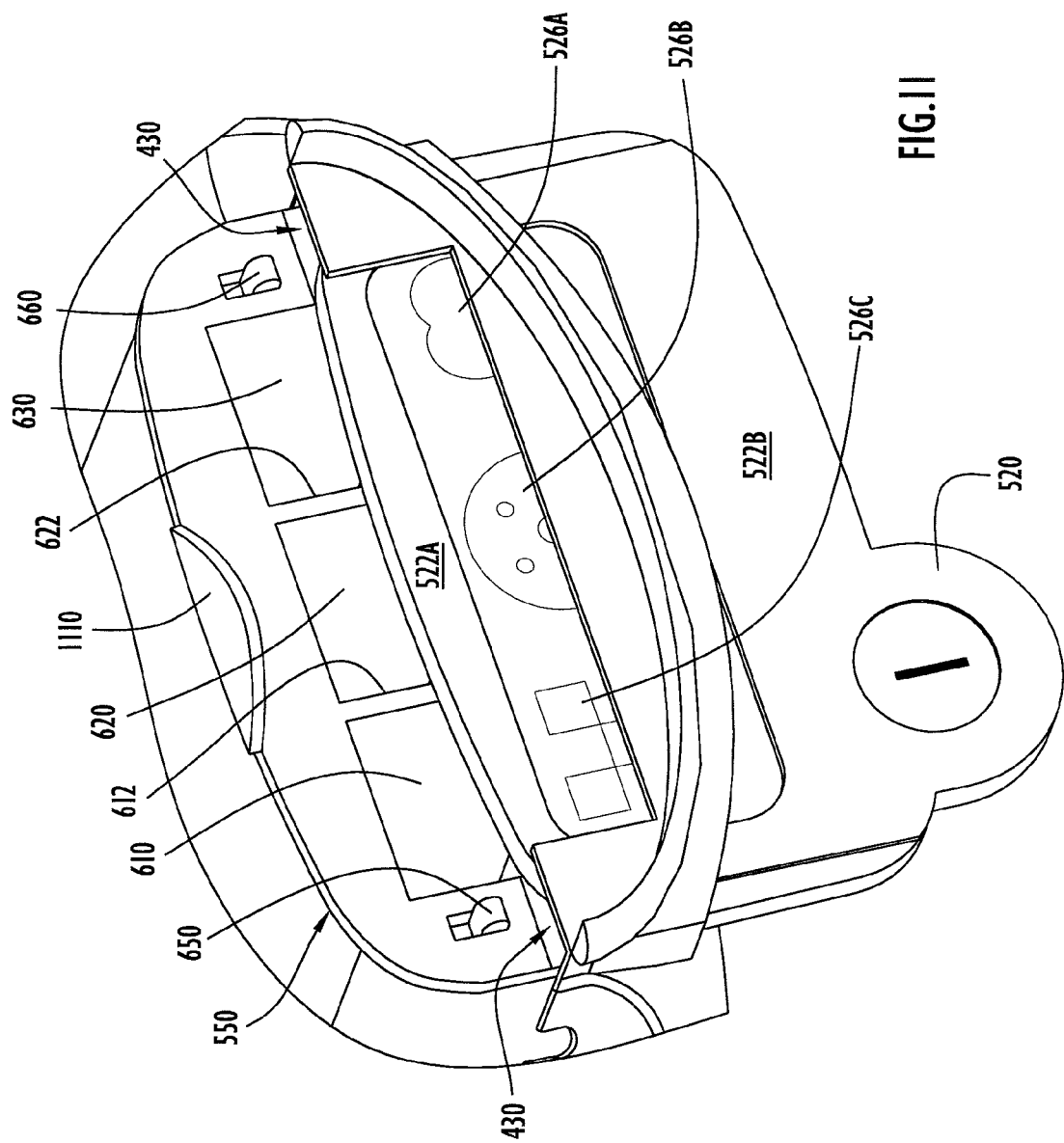

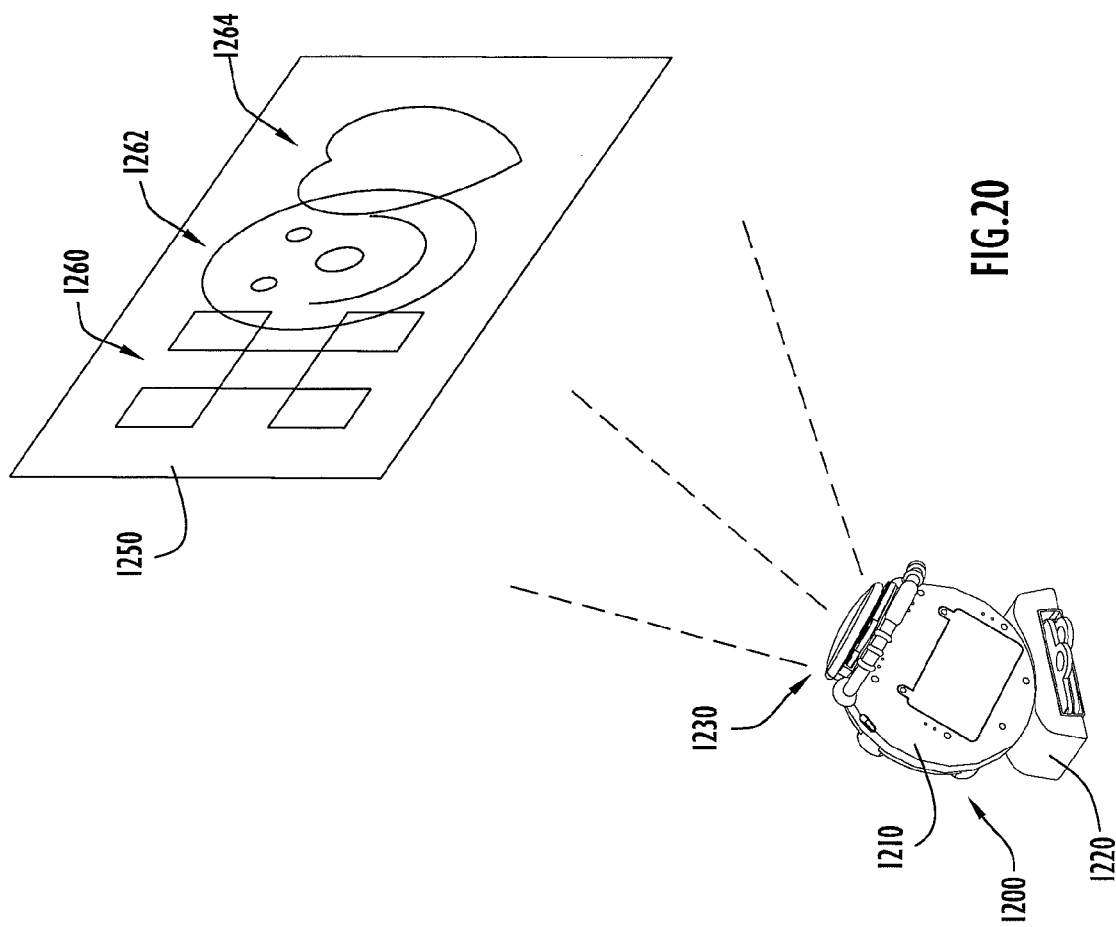

IMAGE PROJECTING DEVICE

BACKGROUND OF THE INVENTION

The present invention relates to an image projecting device. Image projectors are commonly used for soothing children. Projectors generally include a housing within which is contained a light generator and in some cases, a sound generator. A parent can generally choose from a combination of attractive images and simultaneous stimulating sounds. Projectors are sometimes contained in a housing that is mounted to a child receiving or supporting device. Other projects can be placed on a flat surface. Some projectors can be reoriented so as to direct a projected image onto different viewing surfaces (e.g., a ceiling, a wall, etc.).

There are many types of images that attract a child's attention. However, children eventually become disinterested in even the most fascinating images if they are static. A more effective way of maintaining a child's interest is to create variety in the image or images. For example, animating an image or changing between images tends to increase and/or prolong a child's interest. In an animated image, the image may change its form, its position or intensity. In a changing image, the projected image is switched between different images.

There is a need to develop an image projector that projects a dynamic image that can be selectively altered by a user. Specifically, there is a need to develop an image projector that allows a user to select from different images and also to select various image animation schemes.

SUMMARY OF THE INVENTION

Generally, the present specification discloses a children's image projection system. The system includes an image projection device that can project an image onto an image viewing surface. The image projection device includes an image projector which sits on a surface or is coupled to a structure while projecting an attractive viewing image pattern onto an image viewing surface such as a ceiling, a wall or a designated screen. The image projection device generally includes a housing having several separate light sources and multiple interchangeable image slides. In one embodiment, the light sources can emit light of different colors.

Each image slide has multiple, separated, slide image patterns imprinted thereon. Each slide image pattern is positioned in a different location on an image slide. In addition, each separated light source is positioned to correspond to and to project through only one of the slide image patterns during operation. As a result, each individual light source causes only one of the slide image patterns on the image slide to project onto an image viewing surface. Accordingly, each light source forms a separate viewing image pattern on the surface.

The image projection device also includes an electronic controller or system that controls the light intensity and timing of illumination of each of the light sources. The electronic controller further controls a sound generator that can generate audible sensory stimulation with the operation of the image projection feature.

The arrangement of the light sources, the image slide and the image viewing surface is such that even thought the light sources are separate and only one light source passes through one slide image pattern, the light sources can project superimposed viewing image patterns on the image viewing surface. This occurs because light emitted from a light source projects outwardly in an increasingly wider beam (e.g., conical projection). An image slide is appropriately positioned in the line of the light beam at a distance where the beam is only wide enough to pass through one slide image pattern. Thereafter, the light beam continues to widen as it approaches the image viewing surface. Multiple beams reach the image viewing surface in their widened state and are overlapped such that their combined viewing image patterns appear superimposed on the image viewing surface.

The image projection device also includes a light guide positioned around each light source. The light guide prevents light beams emitted from individual light sources from widening into the path of other light source beams before reaching their respective slide image patterns. In other words, the light guide blocks stray light from entering and allows light to travel through the light guide over which the slide is placed to ensure that individual light beams only reach their corresponding slide image patterns. The resulting image projection system projects multiple images onto a surface while varying the timing and light intensity with which each image is displayed relative to other images.

BRIEF DESCRIPTION OF THE DRAWINGS

FIG. 7 illustrates a top perspective view of the image projection device of FIG. 1 showing an image slide partially inserted into the device.

FIG. 11 illustrates a view of some of the components of the image projection device of FIG. 1.

FIG. 20 illustrates an embodiment of an image viewing surface and projected images on the surface.

DETAILED DESCRIPTION OF THE INVENTION

Figure 1:
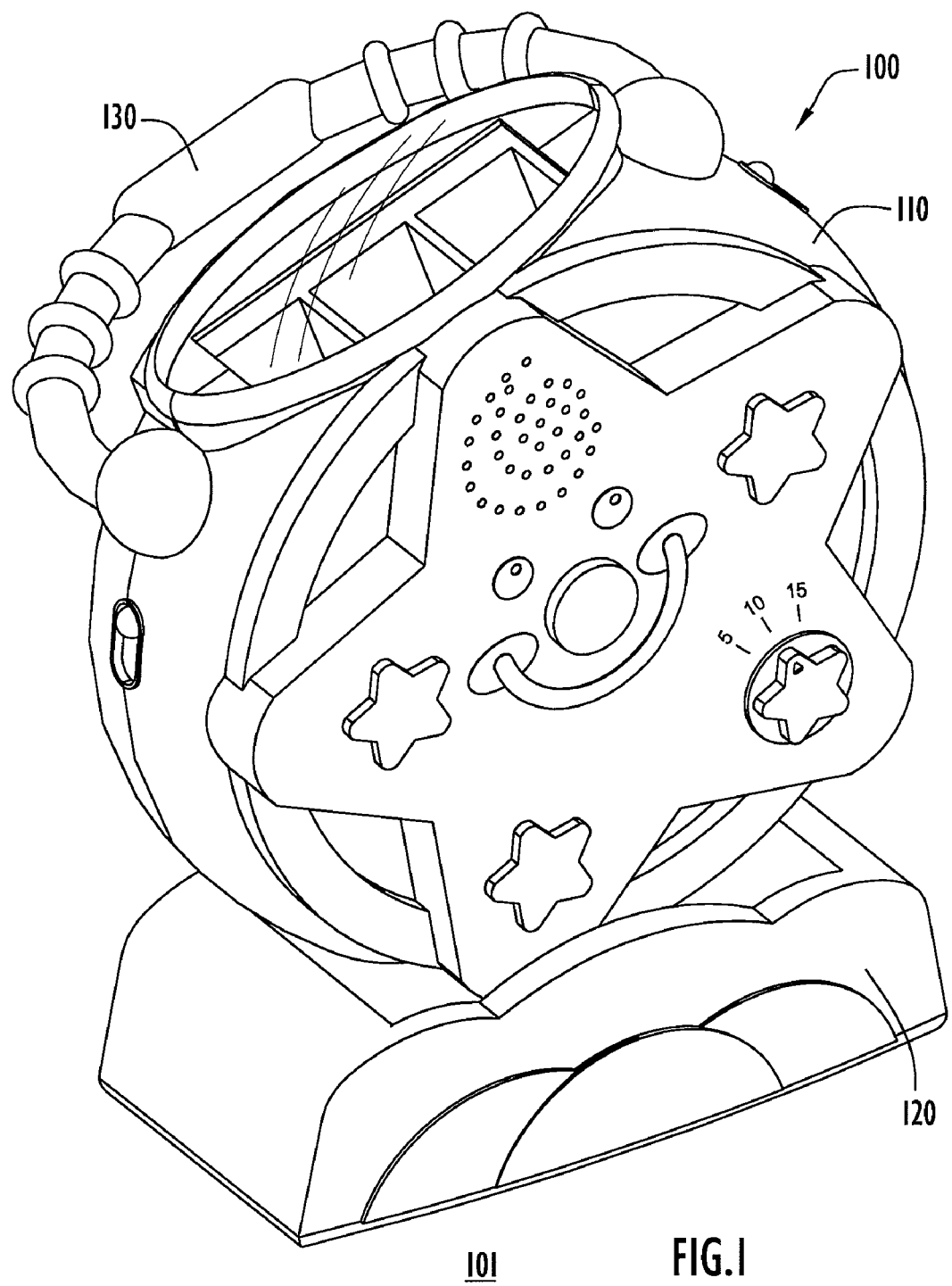
FIG. 1 illustrates a top perspective view of the image projection device in accordance with an embodiment of the present invention.

In accordance with the present invention, an image projection device is disclosed. FIG. 1 illustrates a top perspective view of an embodiment of an image projection device 100. The image projection device 100 includes a housing 110 supported by a base 120 that enables the housing 100 to stand on a supporting surface 101. A handle 130 is pivotally connected to the housing 110 to enable a user to easily transport the image projection device 100.

Figure 2:
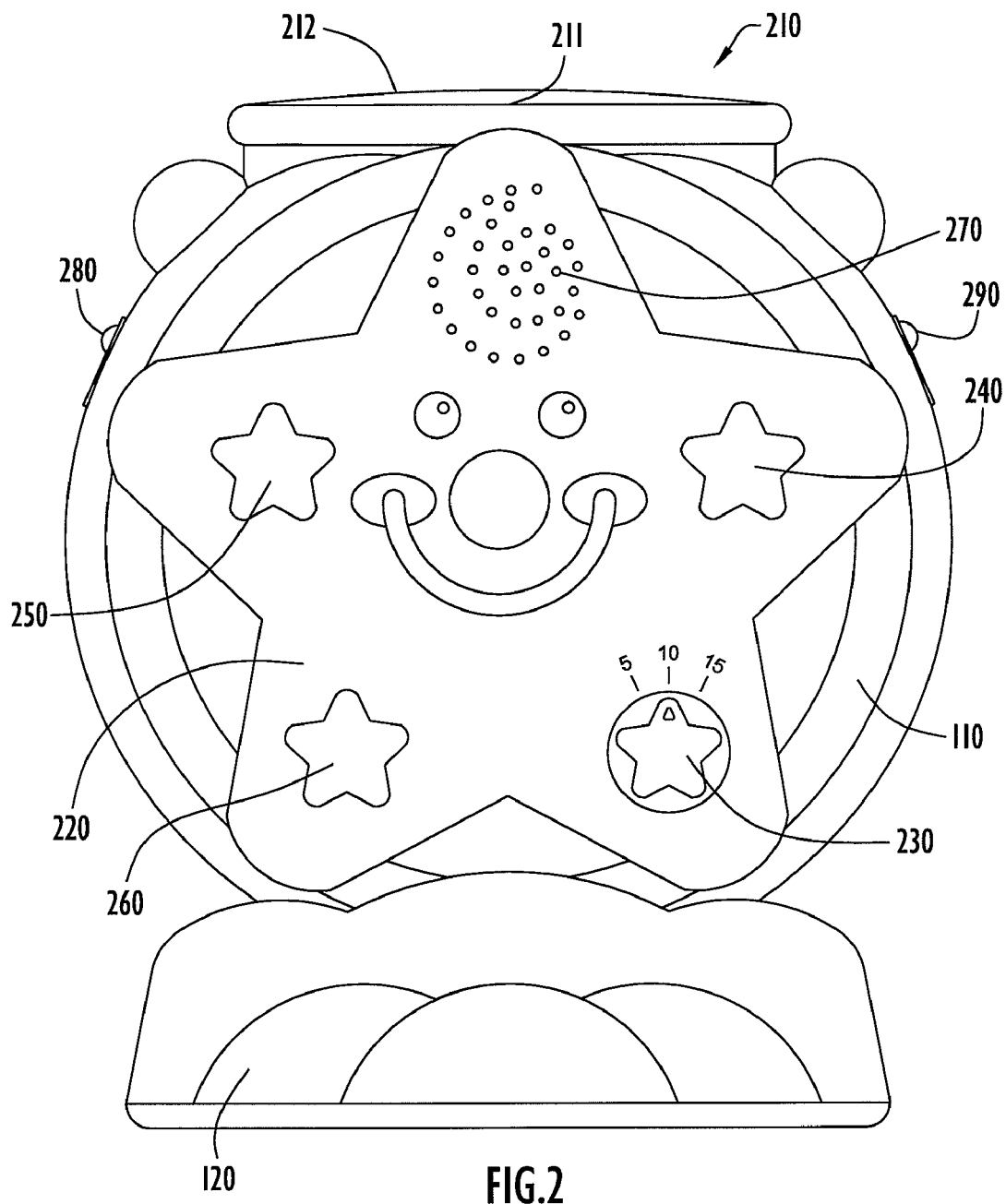
FIG. 2 illustrates a front view of the image projection device of FIG. 1 in a first projection orientation.

FIG. 2 illustrates a front view of the image projection device 110 in a first projection orientation or mode. In this embodiment, this mode can be referred to as a ceiling projection mode because the housing 110 is oriented to project light onto a ceiling. The housing 110 includes a light projection portion 210 from which light can emerge to project one or more images. The housing 110 includes an opening 211 formed in its upper end. A plastic cover 212 is disposed in the opening 211. The light projecting from the housing 110 passes through the cover 212.

As shown in FIG. 2, the housing 110 has a front portion 305 on which is disposed a character 220 in the shape of a star. In other embodiments, the housing 110 can have any shape or configuration. The housing 110 also includes a rear portion 405 that is removably coupled to the front portion 305. Several buttons 240, 250 and 260 are disposed at various locations on the front portion 305. The buttons 240, 250 and 260 are operably connected to switches which are connected to an electronic system that can generate sensory stimulation output (e.g., light, sounds, etc.). The electronic system and its operation will be described in greater detail below.

The functionality of buttons 240, 250 and 260 can be arranged in a variety of ways. For example, each button may be associated with a different type of music or sounds. In one embodiment, button 240 can be pressed by a user to select classical music sounds, button 250 can be pressed to select lullaby sounds and button 260 can be pressed to select nature sounds.

The housing 110 includes several switches 230, 280 and 290. Switch 230 can be turned by a user to select the length of time for outputs from the device 100. In one implementation, the user can select between five, ten or fifteen minute time intervals during which the various lights are projected and sounds are played through speaker 270. Slide switch 280 enables the user to adjust the output volume between soft, medium and high levels. Finally, slide switch 290 enables the user to select between various modes of operation. In one embodiment, the user can choose between the following modes: an off mode; light features with no sounds; sound features with no light; or light and sound features.

Figure 3:
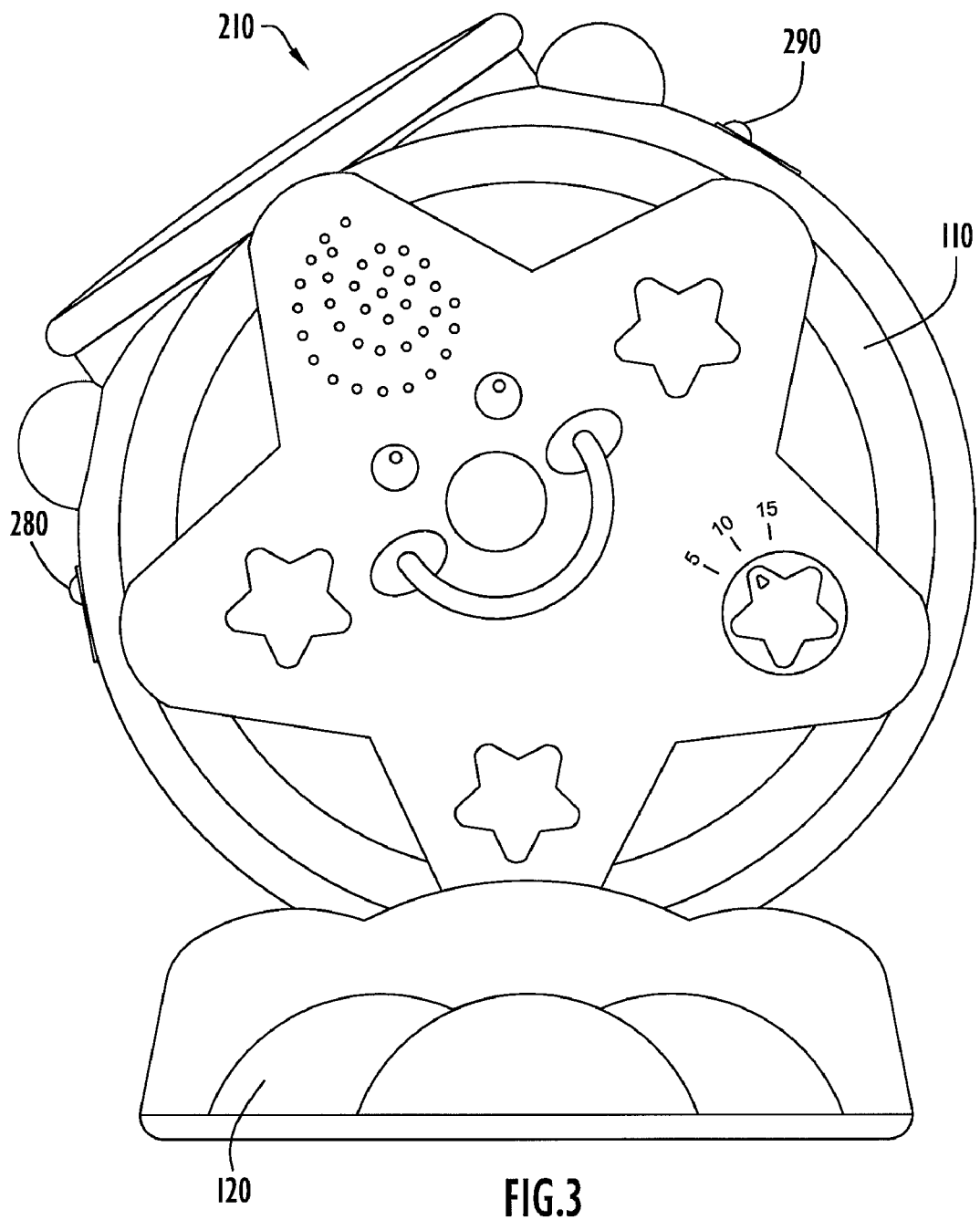
FIG. 3 illustrates a front view of the image projection device of FIG. 1 in a second projection orientation.

FIG. 3 illustrates the image projection device 100 in a second projection orientation or mode. As shown, the housing 110 may be pivoted relative to base 120 to move the light projection portion 210 to point at a different surface. In one implementation, the orientation illustrated in FIG. 2 is an upward projecting configuration that projects light onto a ceiling. The orientation in FIG. 3 projects light at an angle with respect to the FIG. 2 orientation.

Figure 3A:
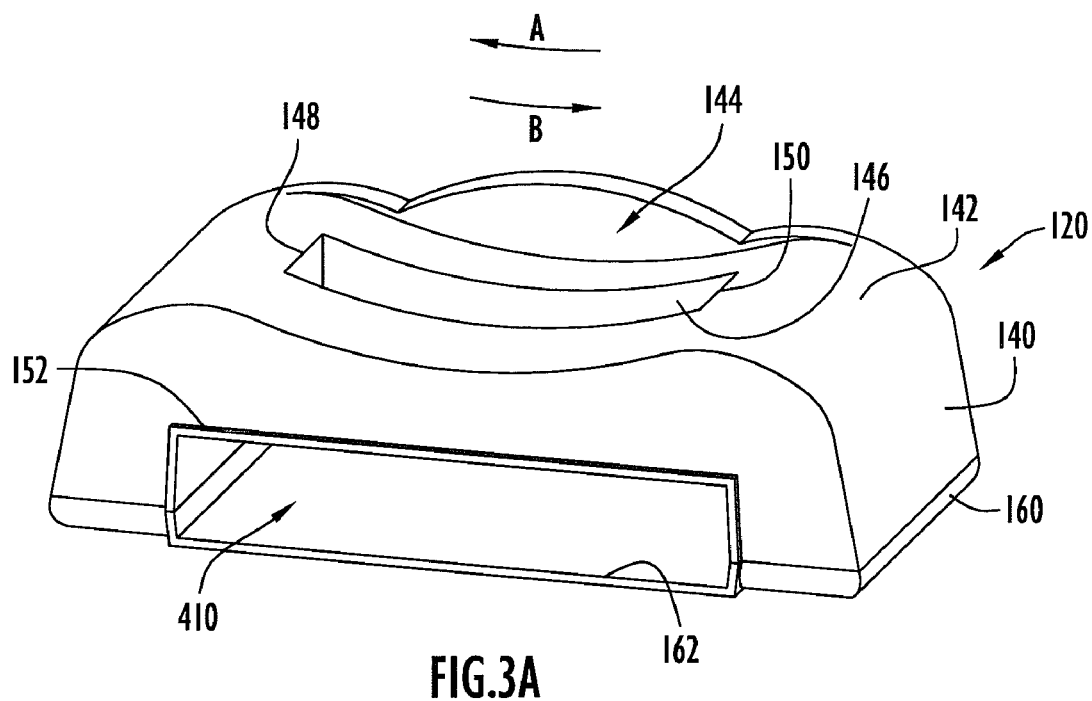
FIGS. 3A and 3B illustrate an embodiment of a base of the image projection device of FIG. 1.
Figure 3B:
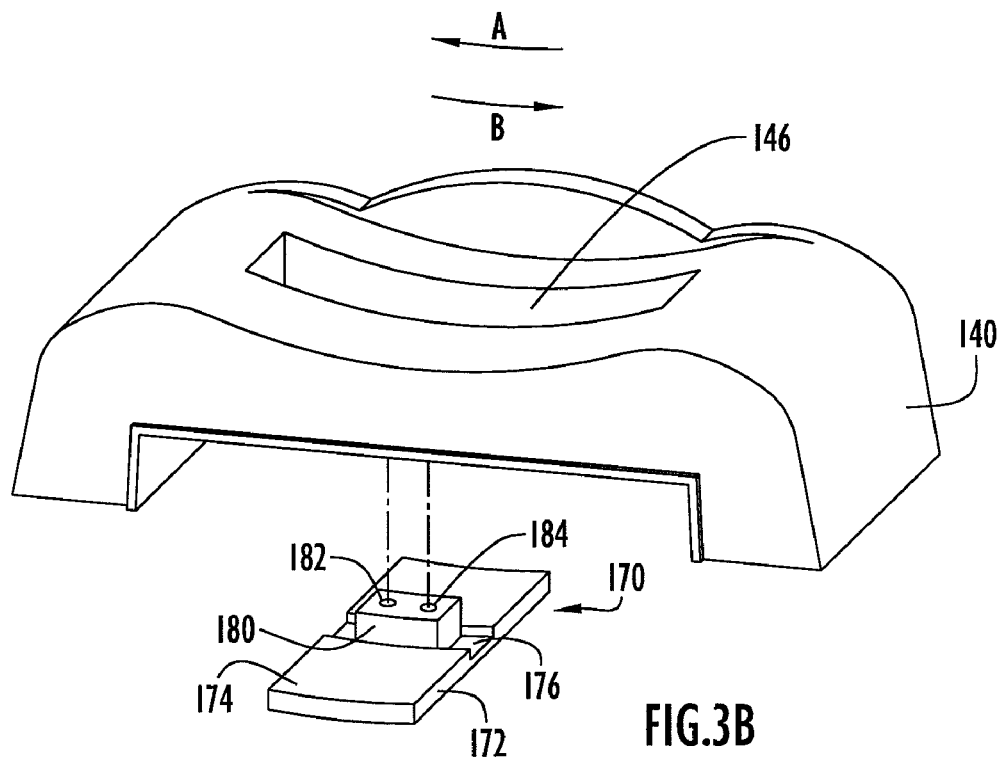

Referring to FIGS. 3A and 3B, some of the components that permit the movement of the housing 110 relative to the base 120 are illustrated. In one embodiment, the base 120 includes an upper body 140 that has an upper surface 142 with an engagement region 144. The engagement region 144 is the portion of the upper surface 142 that engages the lower surface of the housing 110 when the housing 110 and the base 120 are coupled together. The upper surface 142 includes a slot 146 with opposing ends 148 and 150. The slot 146 extends through the upper body 140. The upper body 140 also includes an edge 152 that defines a portion of a slide storage portion 410 in the base 120. The function of the slide storage portion 410 is discussed in more detail below.

The base 120 includes a lower body 160 that is coupled to the upper body 140 using any conventional technique, such as fasteners. The lower body 160 includes an edge 162 that defines a portion of the slide storage portion 410.

Referring to FIG. 3B, the base 120 includes a slider 170 that extends through the slot 146 in the upper body 140 and is coupled to the lower surface of the housing 110. The slider 170 includes a plate 172 with an upper surface 174 and a groove 176 extending from side to side. The slider 170 includes an extension 180 that is located in the groove 176. In one embodiment, the extension 180 is coupled to the plate 172. In another embodiment, the extension is integrally formed with the plate 172. The extension 180 includes holes 182 and 184 through which fasteners (not shown) can be inserted to couple the slider 170 to the housing 110.

The slider 170 can move along the direction of arrows A and B shown in FIGS. 3A and 3B. The range of movement of the slider 170 is limited by the engagement of the extension 180 with the ends 148 and 150 of the slot 146. The housing 110 is retained in a particular orientation with respect to the base 120 due to the friction generated between the upper body 140 and the slider 170 and the weight of the housing 110 on the base 120.

Figure 4:
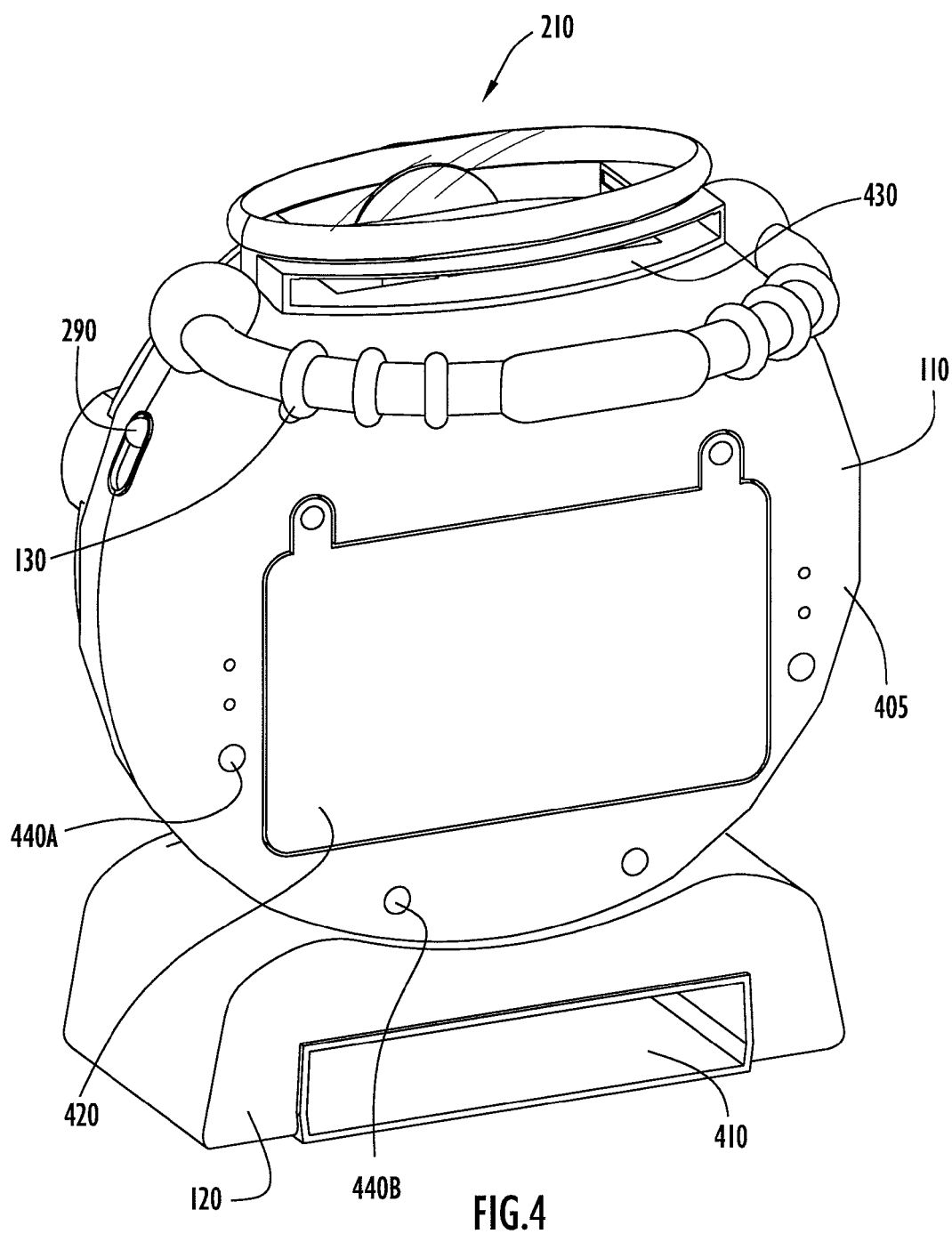
FIG. 4 illustrates a rear perspective view of the image projection device of FIG. 1.

FIG. 4 illustrates a rear view of the image projection device 100. As shown, the base 120 includes a slide storage portion or cavity 410 that is configured to receive image slides in the base 120. A series of fastener openings 440A and 440B receive fasteners (not shown) for securing the rear portion 405 and the front portion 305 of the housing 110 together. Rear portion 405 also includes a battery compartment door 420 for covering a battery compartment (not shown) in which batteries can be disposed. The housing 110 includes a slot 430 on the rear portion 405. The slot 430 forms the opening into which the image slides are inserted for display.

Figure 5:
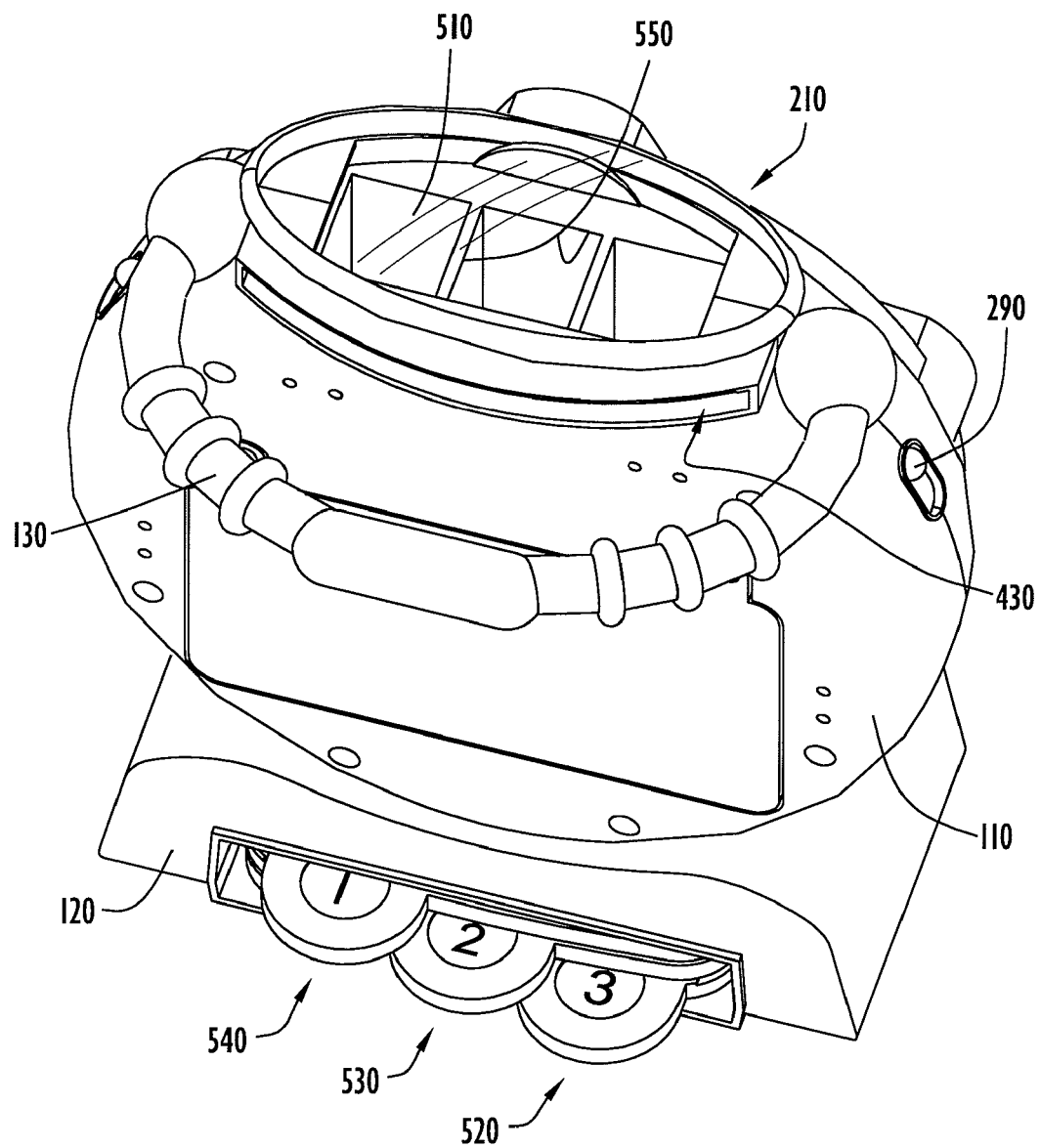
FIG. 5 illustrates a rear perspective view of the image projection device of FIG. 1 with several image slides stored therein.

FIG. 5 illustrates a rear prospective view of the image projection device 100. Several image slides 520, 530 and 540 can be disposed in the slide storage portion 410. As shown, a portion of the image slides can extend from the base 120. One of the image slides 520, 530 and 540 is removed from the slide storage portion 410 and inserted into slide slot 430. When an image slide 520, 530 or 540 is properly positioned for projection, it is located within the light projection portion 210. The structure and operation of the light projection portion 210 will be further described in FIG. 6.

Figure 6:
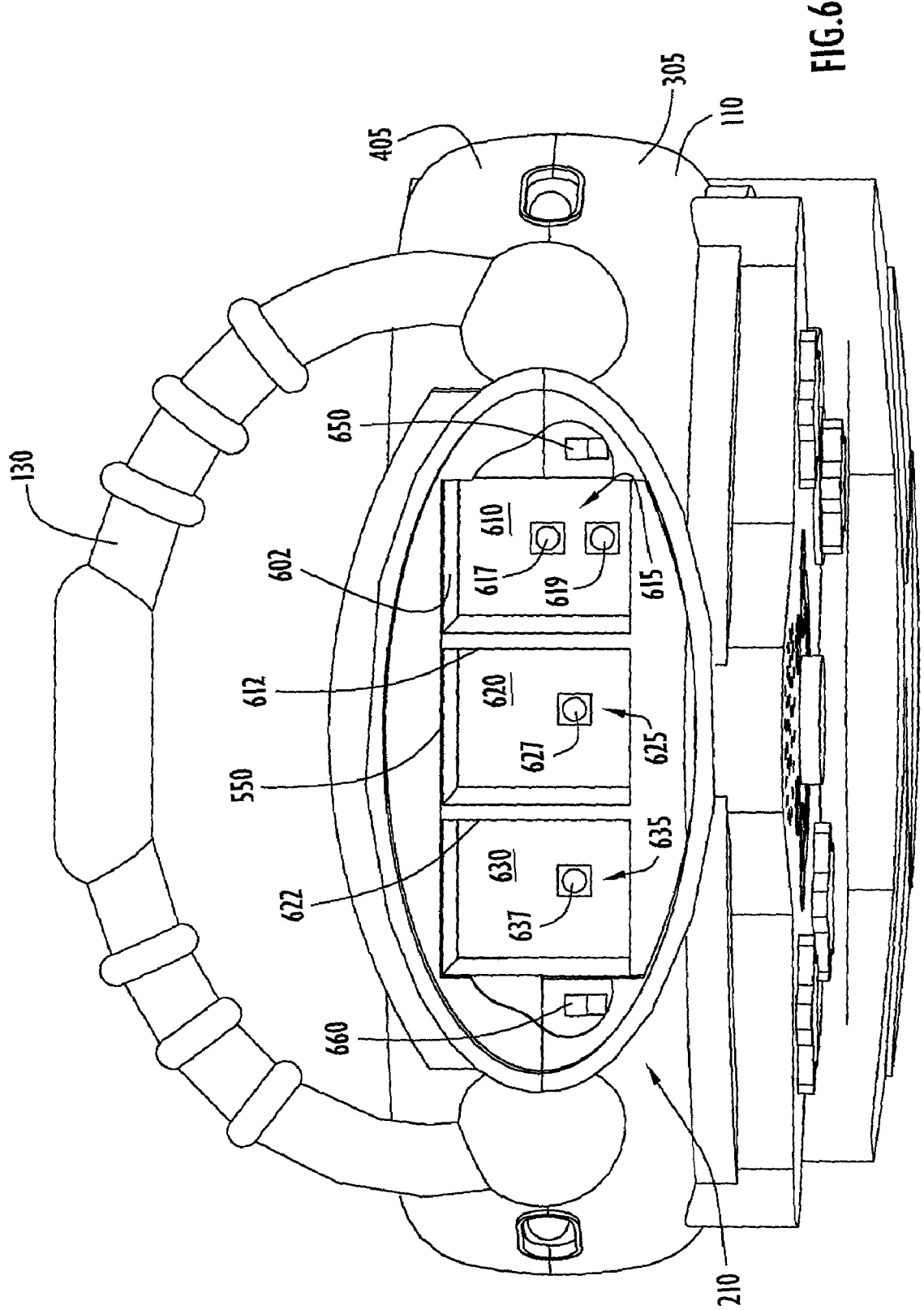
FIG. 6 illustrates a top view of the image projection device of FIG. 1.

FIG. 6 illustrates a top view of the image projection device 100. In this view, the plastic cover at the top of the housing is removed and the light projection portion 210 can be seen. In this embodiment, the light projection portion 210 includes a light guide 550. The light guide 550 includes an outer wall 602 and spaced apart guide walls 612 and 622 that form guide chambers 610, 620 and 630 therebetween.

In this embodiment, the light projection portion 210 includes several light sources 615, 625 and 635 disposed in chambers formed by the light guide 550. In one implementation, the light sources can include one or more light emitting diodes or LEDs. As shown in FIG. 6, light source 615 includes two LEDs 617 and 619, light source 625 includes an LED 627 and light source 635 includes an LED 637. Each of the LEDs can emit a different color than the other LEDs. In various embodiment, the light sources can includes any number of LEDs and combination of colors.

As illustrated, each light source 615, 625 and 635 is disposed in a respective guide chamber 610, 620 and 630. As a result, light emitted by a light source 615, 625 or 635 within one chamber does not immediately mix with light emitted from a different light source in another chamber. The configuration of the light guide 550 prevents light emitted from within one guide chamber 610, 620 or 630 from mixing with light from another guide chamber 610, 620 or 630 until the light emerges from its originating guide chamber 610, 620 or 630.

FIG. 6 also shows the front portion 305 and rear portion 405 of the housing 110 slightly separated. The separation facilitates the illustration of a first image slide recognition switch 650 and a second image slide recognition switch 660. The image slide recognition switches 650 and 660 are positioned so that a part of each switch extends into the slide slot 430 in the path that an image slide 520, 530 or 540 travels to be properly positioned within the light projection portion 210. Operation of the image slide recognition switches 650 and 660 with the image slides 520, 530 and 540 will be described below.

In FIG. 7, an image slide 520 is shown partially inserted into slot 430 in the light projection portion 210 of the housing 110. As shown, a leading edge 522C of an image slide 520 is located within the slide slot 430 and partially covers the light guide 550. Approximately in the position shown in FIG. 7, the image slide 520 reaches the image slide recognition switches 650 and 660. Depending on the structure of the image slide, the image slide 520 may press and trigger either one or both of the image slide recognition switches 650 and 660. Some exemplary implementations of image slides 520, 530 and 540 will be discussed below.

Figure 8A:
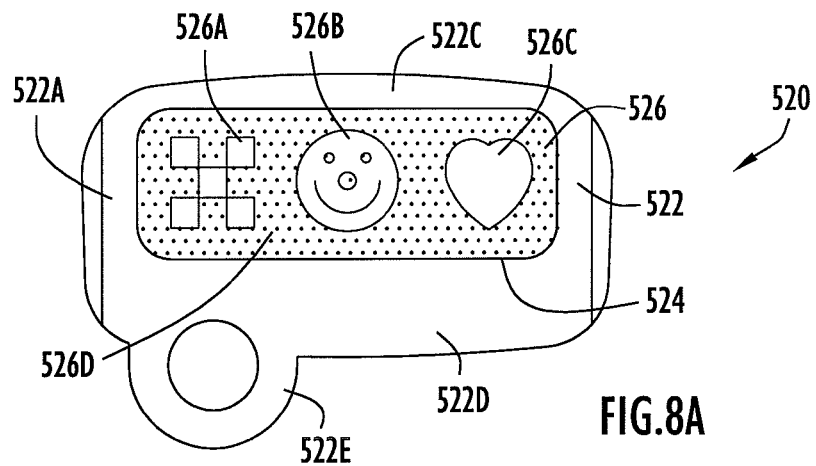
FIG. 8A illustrates a top view of an embodiment of an image slide.
Figure 8B:
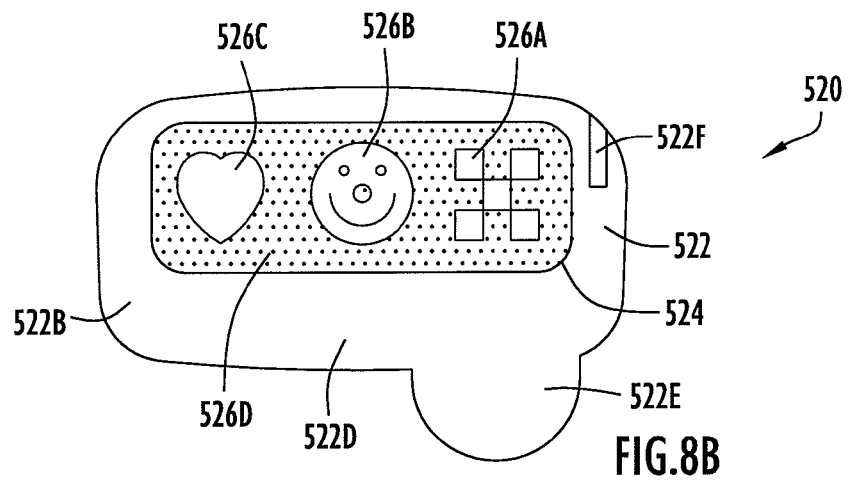
FIG. 8B illustrates a bottom view of the image slide illustrated in FIG. 8A.
Figure 8C:
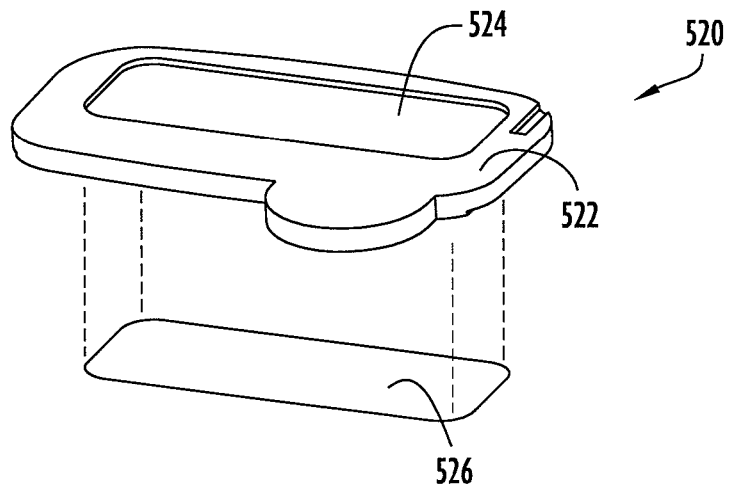
FIG. 8C illustrates an exploded perspective view of the image slide illustrated in FIG. 8A.

An embodiment of an image slide is illustrated in FIGS. 8A-8C. FIG. 8A illustrates a top view of the image slide, FIG. 8B illustrates a bottom view of the image slide and FIG. 8C illustrates an exploded perspective view of the image slide. In this embodiment, the image slide 520 includes a body 522 and an opening 524 formed in the body 522. The body 522 includes an upper surface 522A, a lower surface 522B, a leading edge 522C, a trailing edge 522D, a handle portion 522E and an identification or identity portion 522F.

Disposed in the opening 524 is a plastic film 526 that includes several images 526A, 526B and 526C that are defined by clear or transparent areas on the film 526. The images 526A, 526B and 526C are separate from each other and are formed or defined by an opaque or non-transparent coating on the area of the film 526 that surround the images, thereby forming a non-transparent portion 526D. As a result, light that projects on the film 526 will only pass through the transparent portions that form the images 526A, 526B and 526C. Each of the images 526A, 526B and 526C is isolated or separated from each other by a non-transparent portion.

As shown in FIG. 8B, the lower surface 522B of the body 522 includes an identification portion 522F. In this embodiment, identification portion 522F is a recess formed in the body 522. As the slide 520 is inserted into the slot 430 of the housing 110, the identification portion 522F is aligned with one of the image slide recognition switches. Since identification portion 522F is a recess, it does not engage or close the image slide recognition switch 650. However, the opposite side of the lower surface 522B does not include a corresponding recess, and therefore the other image slide recognition switch 660 in the housing 110 is pressed and triggered when slide 520 is inserted. Thus, for image slide 520, the combination of image slide recognition switch 650 not being triggered and image slide recognition switch 660 being triggered is received by the electronic controller and a specific output associated with slide 520 is generated.

Referring to FIG. 8C, the body 522 of the slide 520 and the film 526 are illustrated. The slide 520 can be a molded plastic article with the film 526 being a clear, transparent piece of plastic that is molded between portions of the slide body 522. The film 526 is disposed so that it covers the opening 524 in the body 522.

Figure 9A:
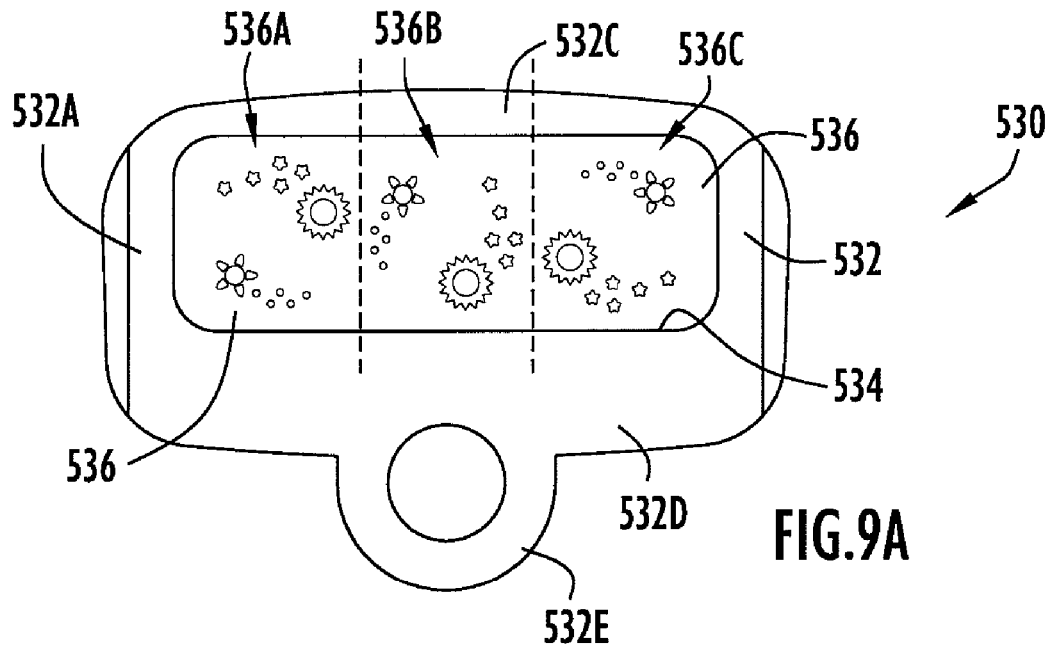
FIG. 9A illustrates a top view of an alternative embodiment of an image slide.
Figure 9B:
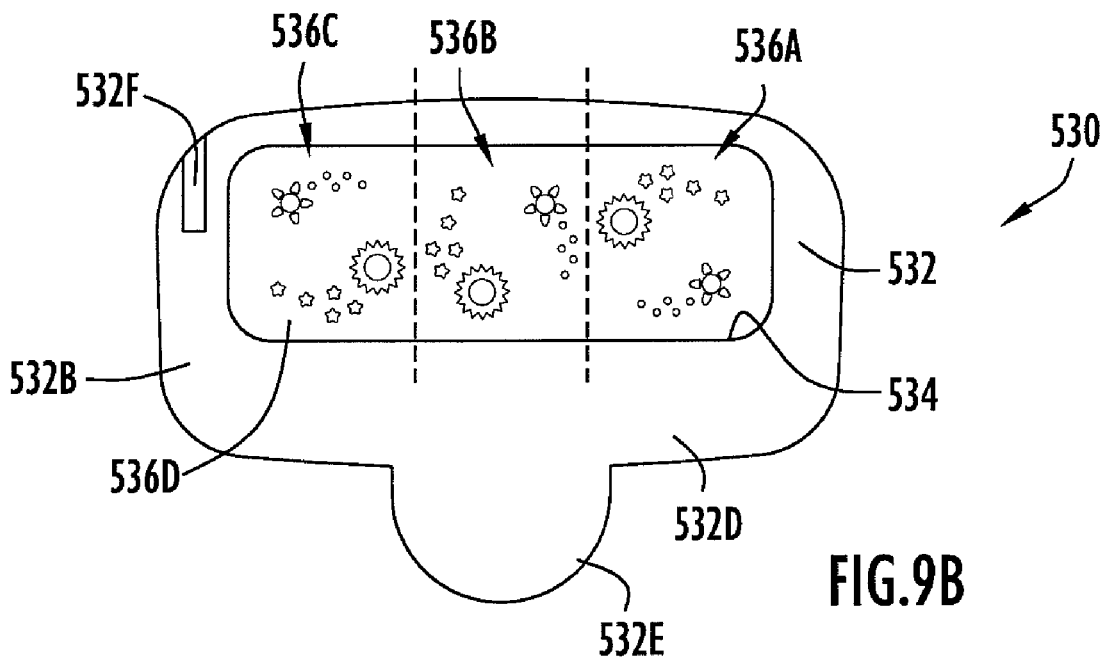
FIG. 9B illustrates a bottom view of the image slide illustrated in FIG. 9A.

An alternative embodiment of an image slide is illustrated in FIGS. 9A and 9B. FIG. 9A illustrates a top view of the image slide and FIG. 9B illustrates a bottom view of the image slide. In this embodiment, the image slide 530 includes a body 532 and an opening 534 formed in the body 532. The body 532 includes an upper surface 532A, a lower surface 532B, a leading edge 532C, a trailing edge 532D, a handle portion 532E and an identification or identity portion 532F.

Disposed in the opening 534 is a film 536 that includes several images 536A, 536B and 536C that are clear or transparent. The images 536A, 536B and 536C are formed or defined by an opaque or non-transparent coating on the area of the film 536 that surround the images and forms a non-transparent portion 536D. As a result, light that projects on the film 536 will only pass through the transparent portions that form the images 536A, 536B and 536C. Each of the images 536A, 536B and 536C is isolated or separated from each other by a non-transparent portion. Dashed lines are drawn on FIG. 9A to simplify the understanding of separate images on the slide 530 that are associated with different light chambers.

As shown in FIG. 9B, the lower surface 532B of the body 532 includes an identification portion 532F. In this embodiment, identification portion 532F is a recess formed in the body 532. As the slide 530 is inserted into the slot 430 of the housing 110, the identification portion 532F does not engage or close image slide recognition switch 660. However, the opposite side of the lower surface 532B does not include a corresponding recess, and therefore image slide recognition switch 650 in the housing 110 is pressed and triggered when slide 530 is inserted. Thus, for image slide 530, the combination of image slide recognition switch 660 not being triggered and image slide recognition switch 650 being triggered is received by the electronic controller and a specific output associated with slide 530 is generated.

Figure 10A:
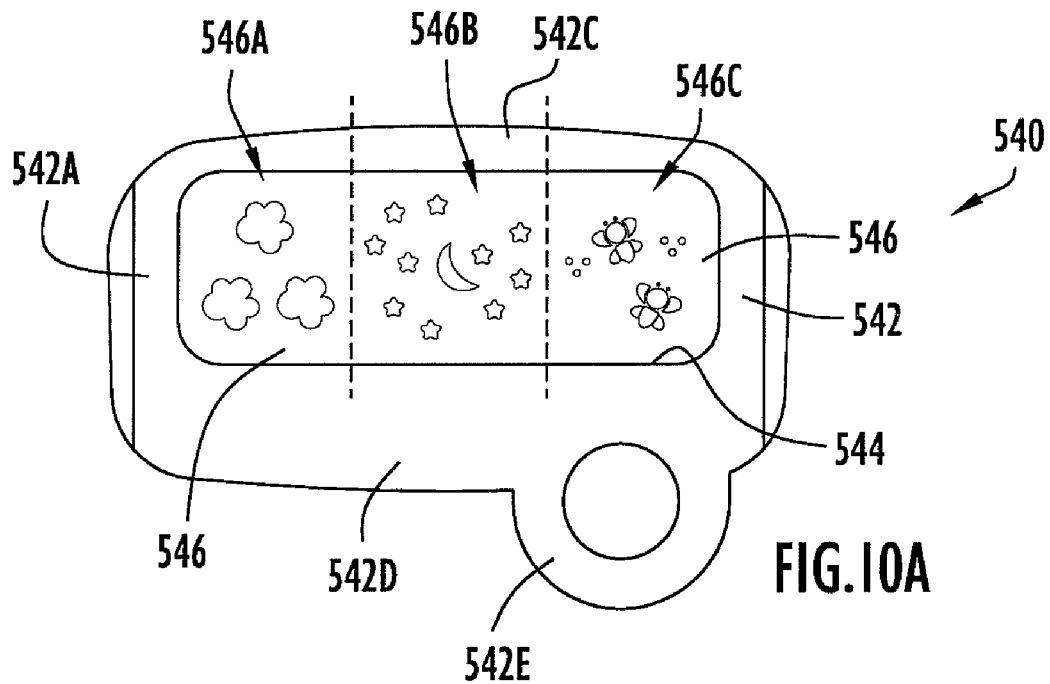
FIG. 10A illustrates a top view of an alternative embodiment of an image slide.
Figure 10B:
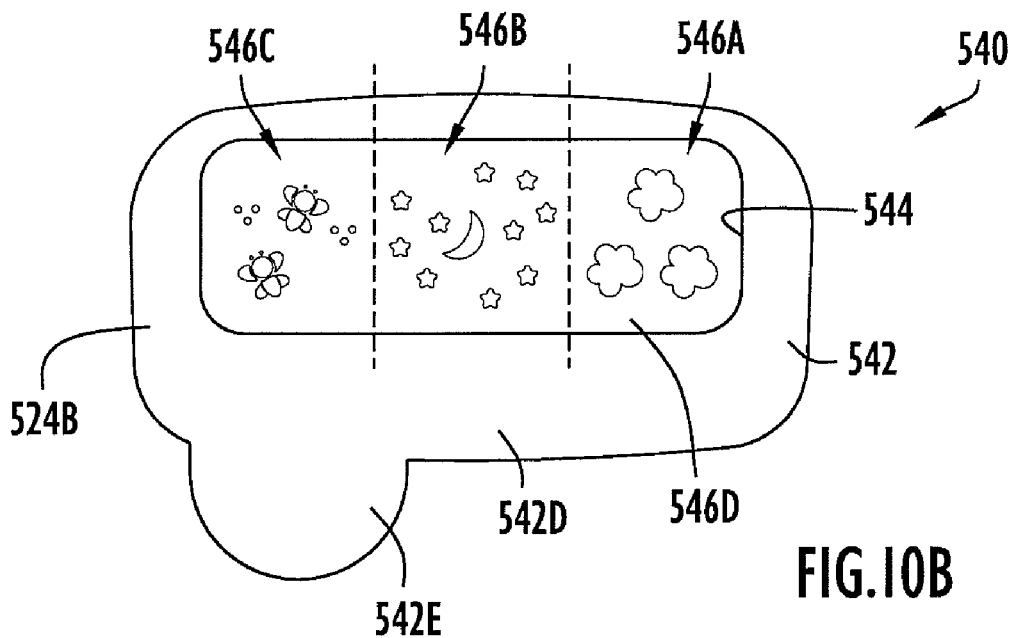
FIG. 10B illustrates a bottom view of the image slide illustrated in FIG. 10A.

An alternative embodiment of an image slide is illustrated in FIGS. 10A and 10B. FIG. 10A illustrates a top view of the image slide and FIG. 10B illustrates a bottom view of the image slide. In this embodiment, the image slide 540 includes a body 542 and an opening 544 formed in the body 542. The body 542 includes an upper surface 542A, a lower surface 542B, a leading edge 542C, a trailing edge 542D, a handle portion 542E and an identification portion 542F.

Disposed in the opening 544 is a film 546 that includes several images 546A, 546B and 546C that are clear or transparent. The images 546A, 546B and 546C are formed or defined by an opaque coating on the area of the film 546 that surround the images and forms a non-transparent portion 546D. As a result, light that projects on the film 546 will only pass through the transparent portions that form the images 546A, 546B and 546C. Each of the images 546A, 546B and 546C is isolated or separated from each other by a non-transparent portion. Dashed lines are drawn on FIG. 10A to simplify the understanding of separate images on the slide 540.

As shown in FIG. 10B, unlike image slides 520 and 530, the lower surface 542B of the body 542 does not include any recess that forms an identification portion. As the slide 540 is inserted into the slot 430 of the housing 110, the slide 540 engages both of the image slide recognition switches 650 and 660. The closing of both image slide recognition switches 650 and 660 is received by the electronic controller and a specific output associated with slide 540 is generated.

FIG. 11 illustrates a close-up view of the top portion of light projection device 100. In this view, the front housing 305 is removed to show an image slide 520 partially inserted into the slide slot 430. As the image slide 520 is inserted into slide slot 430, the image slide 520 begins to cover the light guide 550. Specifically, slide image pattern 526C of the image slide 520 begins to cover guide chamber 610, slide image pattern 526B of the image slide 520 begins to cover guide chamber 620 and slide image pattern 526A of the image slide 520 begins to cover guide chamber 630.

In addition, FIG. 11 shows a guide wall 612 aligned between slide image pattern 526C and slide image pattern 526B. Similarly, a guide wall 622 is aligned between slide image pattern 526B and slide image pattern 526A. In this position, the leading edge 522A of image slide 520 is inserted through slide slot 430 and approaches image slide recognition switches 650 and 660. In the final use position of image slide 540, a slide stop 1110 prevents the leading edge 522A from sliding further into slide slot 430.

Figure 12:
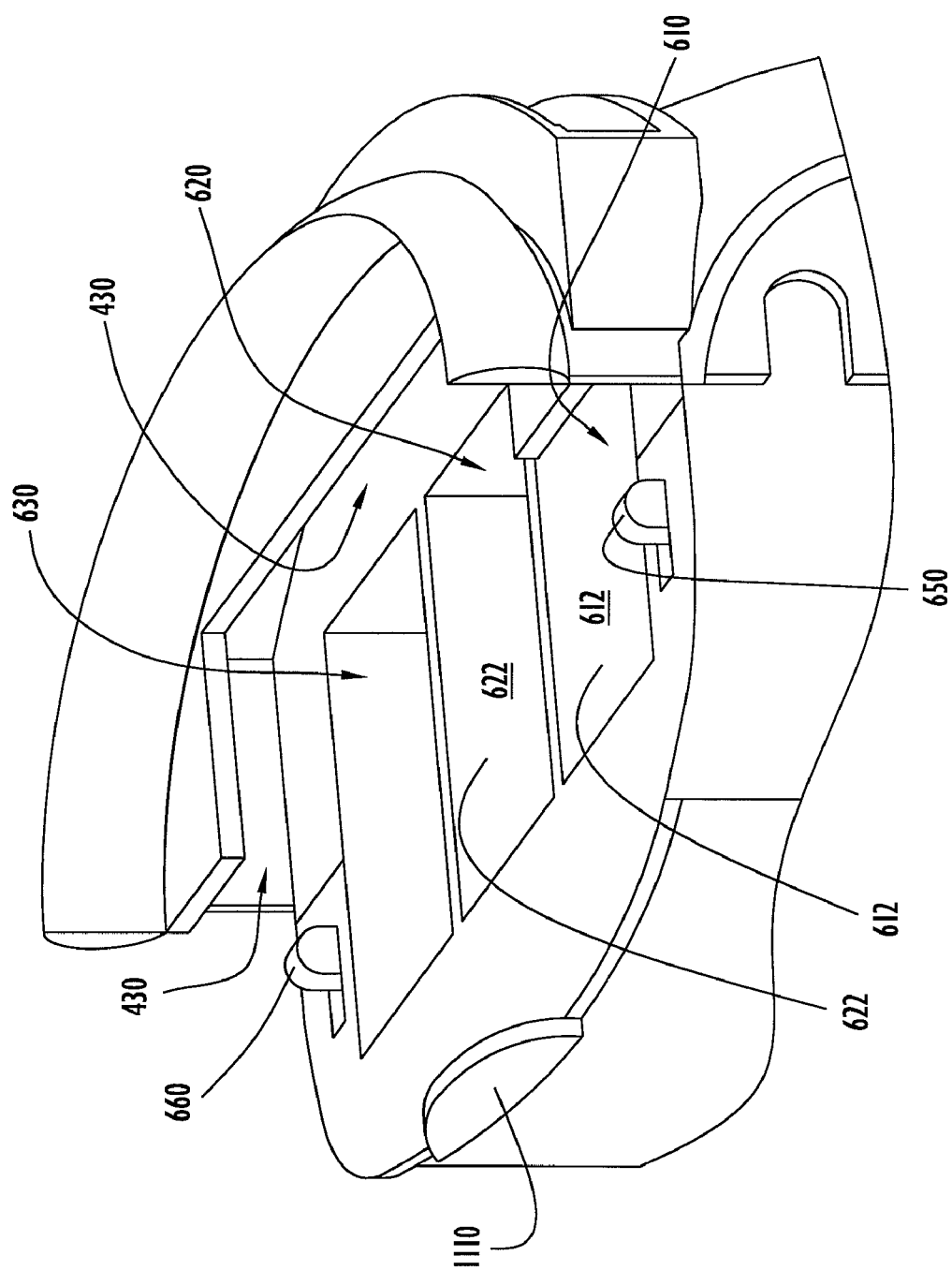
FIG. 12 illustrates a side view of the components illustrated in FIG. 11 of the image projection device.
Figure 13:
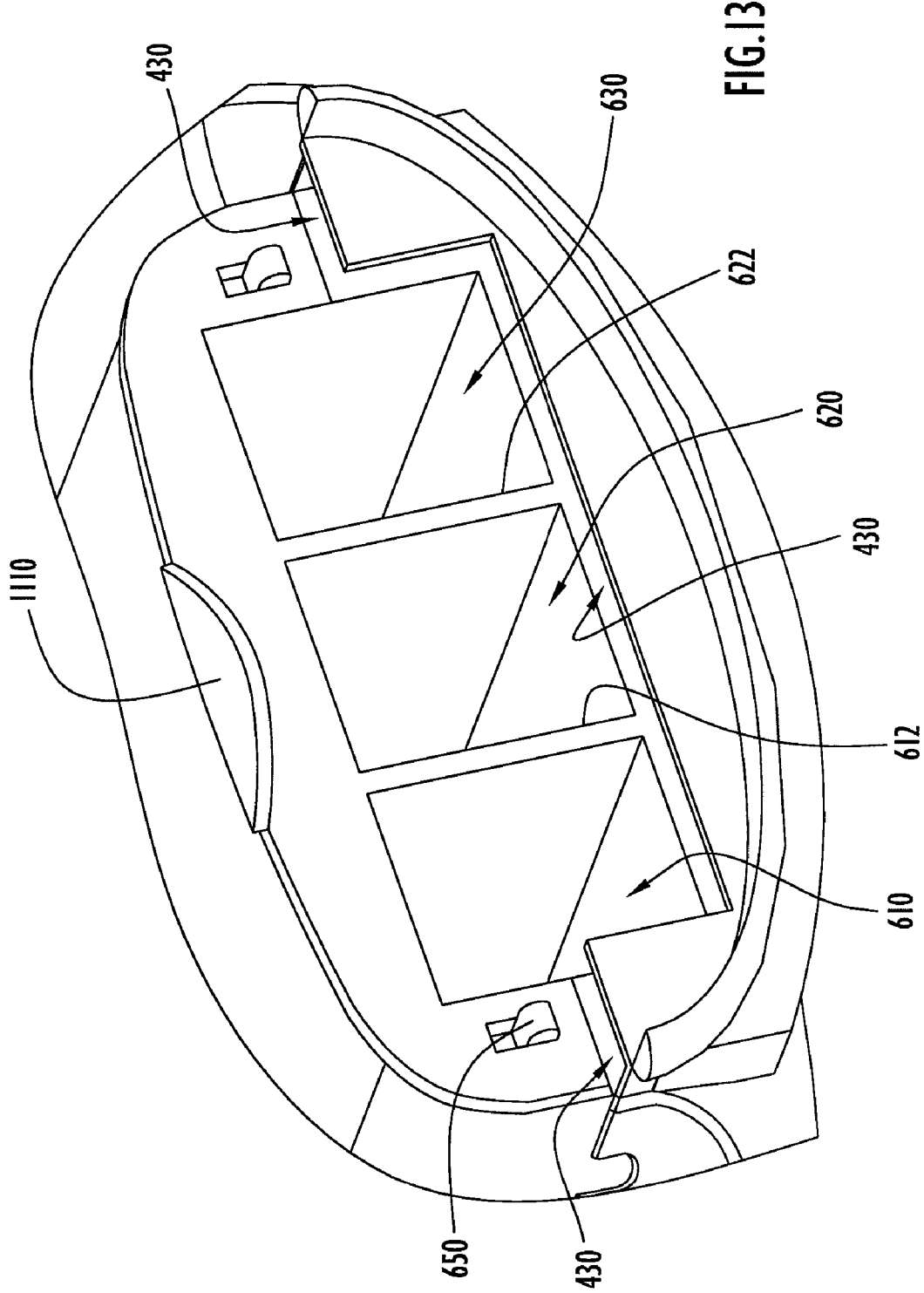
FIG. 13 illustrates a view of some of the internal components of the image projection device of FIG. 1.

FIGS. 12 and 13 illustrate close-up views of the light projection device 100 with the front housing 305 removed to show, in greater detail, some of the internal components of the device 100. In particular, the relationship between the image slide recognition switches 650 and 660 and the slide slot 430 is illustrated. In this embodiment, the slide recognition switches 650 and 660 are spring-mounted buttons that can be depressed to electronically close a switch. The distance to which the switches extend into the slot 430 corresponds to the depth of the identification portions or recesses on the image slides. Each switch extends a distance into the slot 430 so that a portion of an inserted image slide without a recess can contact and press down on the switch.

Figure 14:
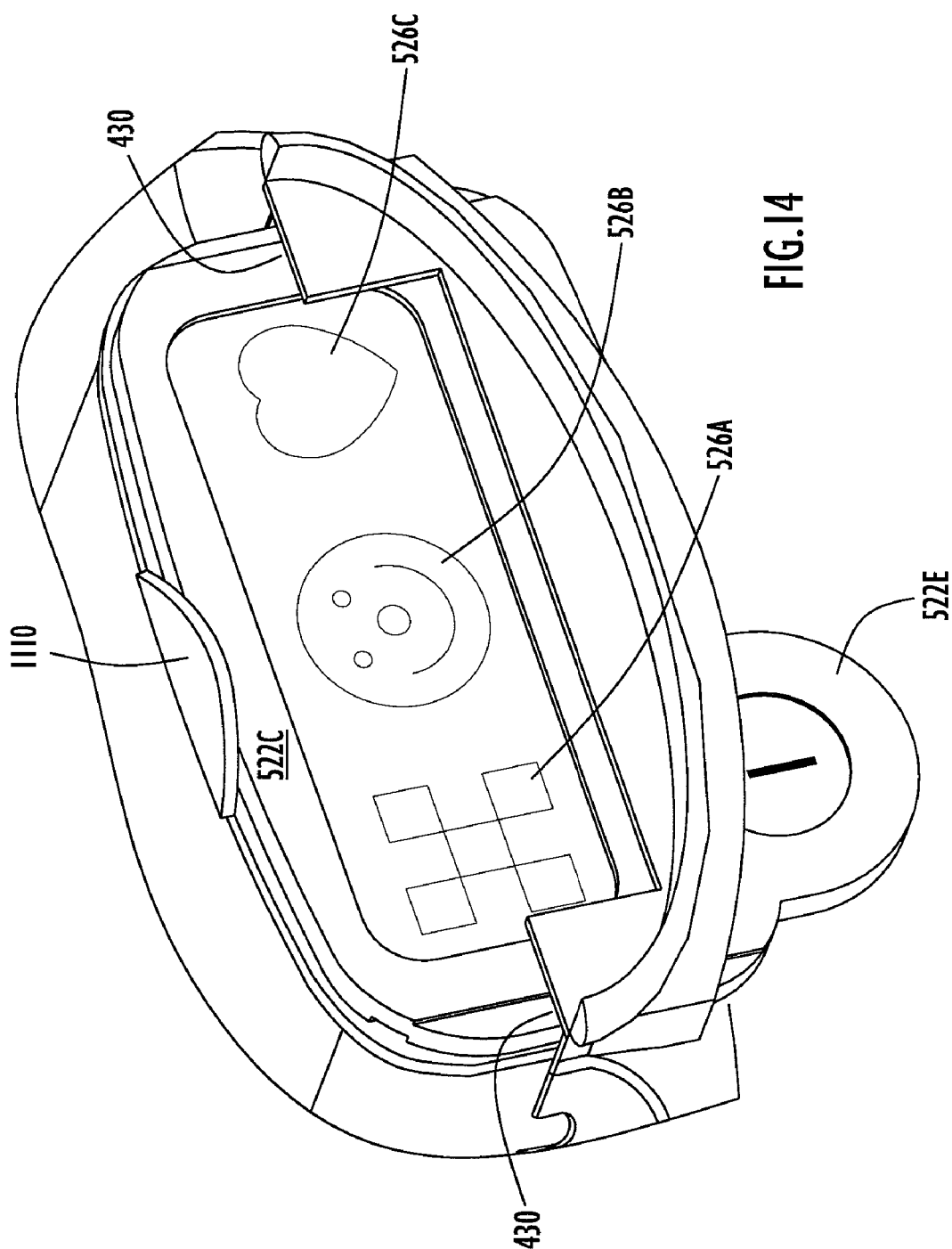
FIG. 14 illustrates a view of the components illustrated in FIG. 13 for the image projection device with an image slide inserted into a slide slot.

FIG. 14 illustrates a close-up view of the light projection device 100. As shown, the image slide 520 is fully inserted into the slide slot 430. As mentioned above, the image slide 520 is fully inserted into the slide slot 430 when the leading edge 522A of image slide 520 contacts the slide stop 1110. In the fully inserted position, the image slide 520 has either compressed or received one or both of image slide recognition switches 650 and 660, depending on the particular identification portion of the slide 520. Furthermore, in the fully inserted position, slide image pattern 526A completely covers guide chamber 610, slide image pattern 526B completely covers guide chamber 620 and slide image pattern 526C completely covers guide chamber 630. In one implementation, the image slide may contact the upper surfaces of the light guide.

Figure 15:
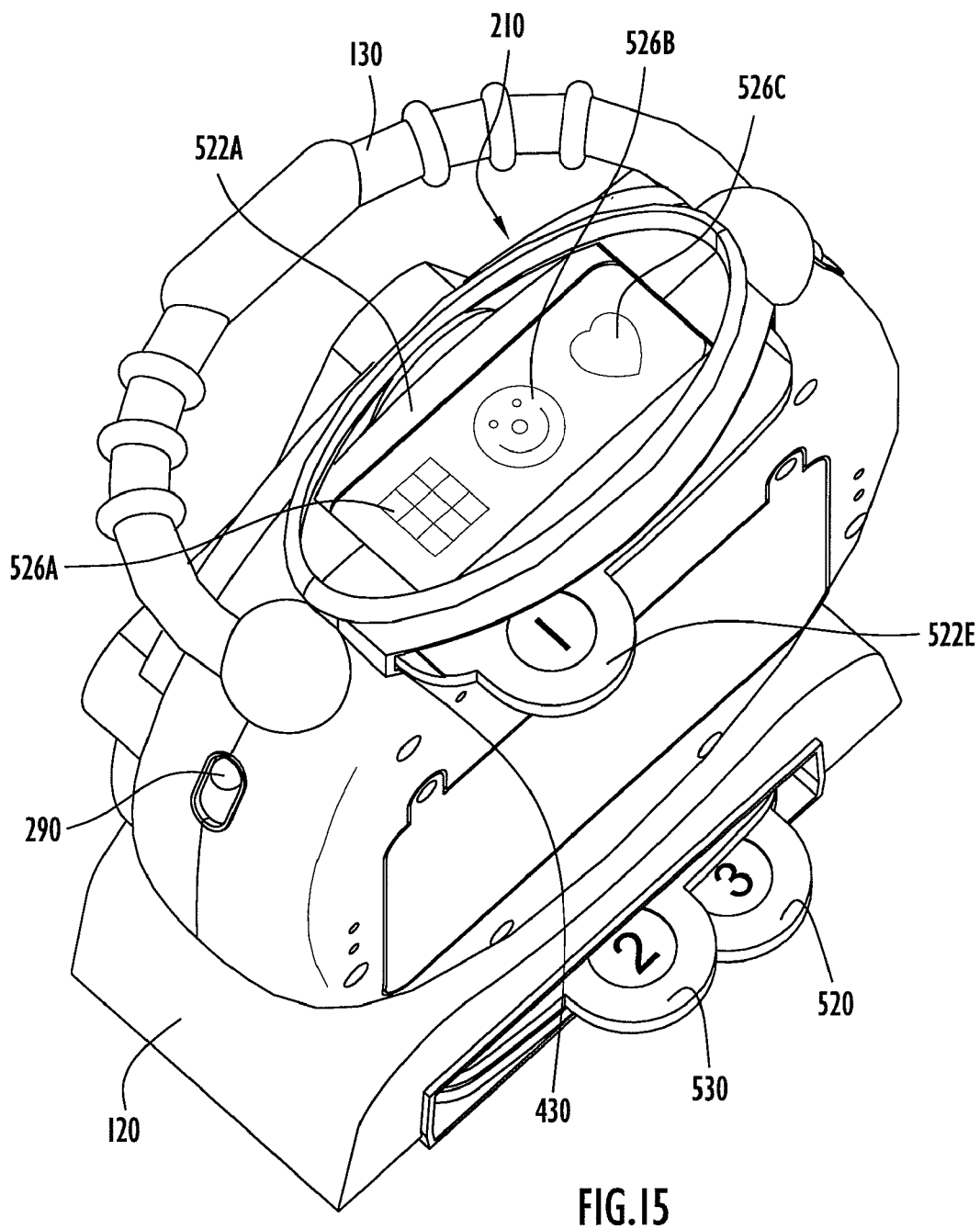
FIG. 15 illustrates a top perspective view of the image projection device of FIG. 1 showing an image slide fully inserted into the slide slot.

FIG. 15 illustrates a top perspective view of the fully assembled light projection device 100. As shown, slide image patterns 526A, 526B and 526C completely cover their respective guide chambers 610, 620 and 630. When light sources 615, 625 and 635 are illuminated, they each project light outwardly along guide walls 612 and 622 and out of the corresponding chambers 610, 620 and 630. The chambers 610, 620 and 630 contain the light from each individual light source 615, 625 and 635, preventing light within one light chamber 610, 620 and 630 from entering another chamber before the light emerges from the light chambers 610, 620 and 630 and passes through respective slide image patterns on the inserted image slide.

Image slides 520, 530 and 540 are positioned adjacent the point of emergence of light from light chambers 610, 620 and 630. As a result, light projected from a particular light chamber 610, 620 and 630 passes through its respective slide image pattern before the light is allowed to intersect with projected light from other light chambers. For example, light projected from light source 615 in light chamber 610 passes through slide image pattern 526A before the light is allowed to intersect with projected light from other chambers (e.g., 620, 630). The light projected from within light chamber 610 passes through slide image pattern 526A and forms a projection of slide image pattern 526A onto an image viewing surface. At the same time, no light from chambers 620 or 630 passes through slide image pattern 526A.

After light passes from its respective light chamber 610, 620 or 630, and through its respective slide image pattern (e.g., 526A, 526B, 526C), light from multiple chambers mix and intersect. As a result, the intersecting light rays can project multiple superimposed images onto a surface. In addition to overlapping of images, light sources may be illuminated with varied intensity and may be timed or sequenced.

Figure 16:
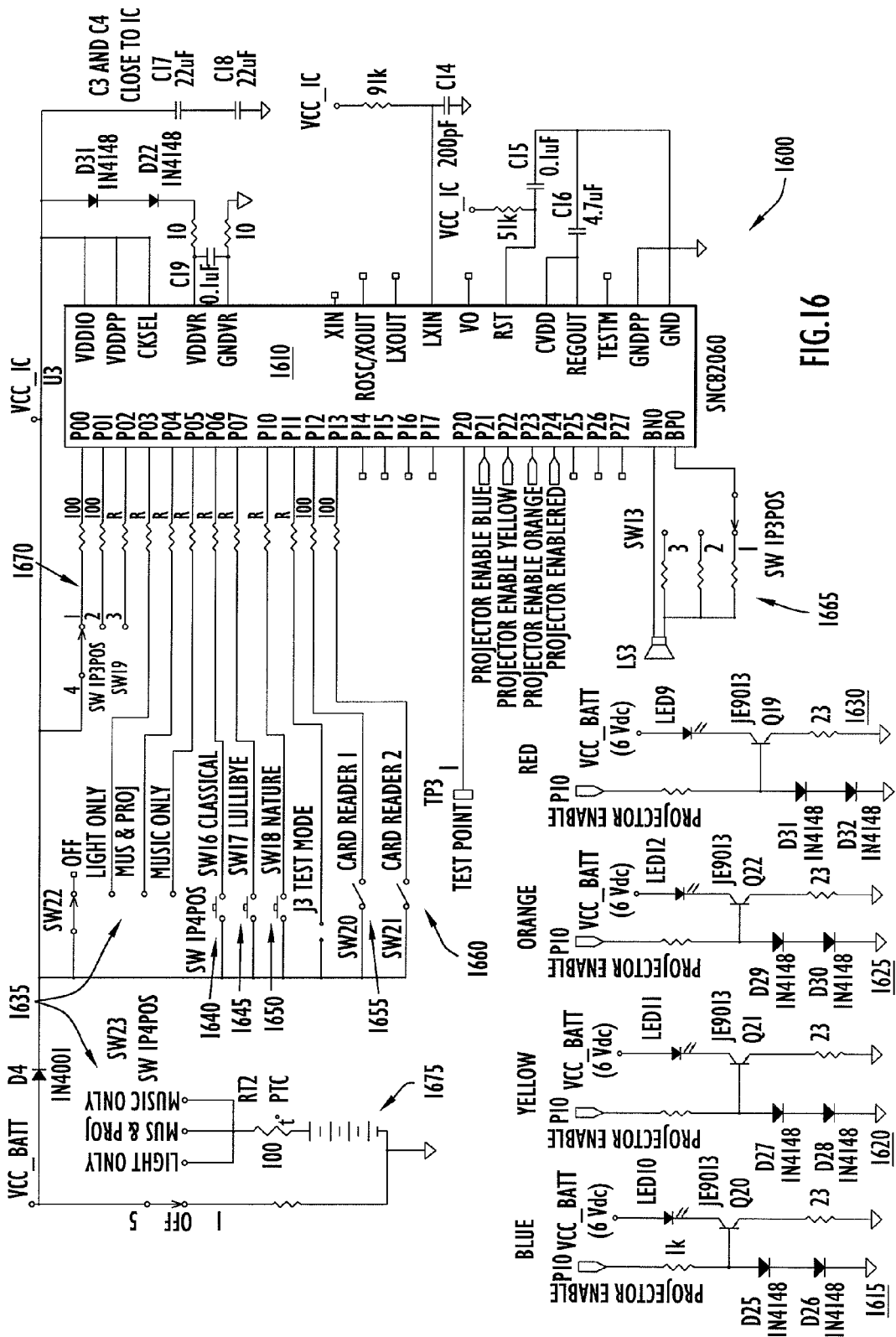
FIG. 16 illustrates an electronic schematic diagram of the electronic components of the image projection device of FIG. 1.

FIG. 16 illustrates a schematic drawing of an embodiment of an electronic control system 1600 of device 100. The electronic system 1600 includes an electronic controller 1610 that receives information from various input devices (e.g., switches) and controls various output devices (e.g., a speaker, lights). Specifically, the controller 1610 receives signals from switch 1635. Switch 1635 corresponds to switch 290 which allows a user to choose between different modes of operation: off, only light output, sound and light output, or only sound output.

Switches 1640, 1645 and 1650 correspond to buttons 240, 250 and 260 which allow a user to respectively choose particular types of sounds when the switches 290 and 1635 are actuated to transmit sound. Switches 1655 and 1660 correspond to image slide recognition switches 650 and 660 and detect which image slide 520, 530 or 540 is inserted in slide slot 430. The identification of the image slide is accomplished by the electronic controller 1610. The combination of actuated switches 650 and 660 causes the controller 1610 to generate specific sensory responses.

In this embodiment, switch 1665 corresponds to switch 280 and allows a user to choose a high, medium or low volume. Switch 1670 corresponds to switch 230 and allows a user to choose the duration of sound generation. LEDs 1615, 1620, 1625 and 1630 are representative of and correspond to LEDs 617, 619, 627 and 637 whose intensity and duration of illumination are controlled by the electronic controller 1610. In alternative embodiments, the various output controlling features provided for the image projecting device can vary.

Figure 17:
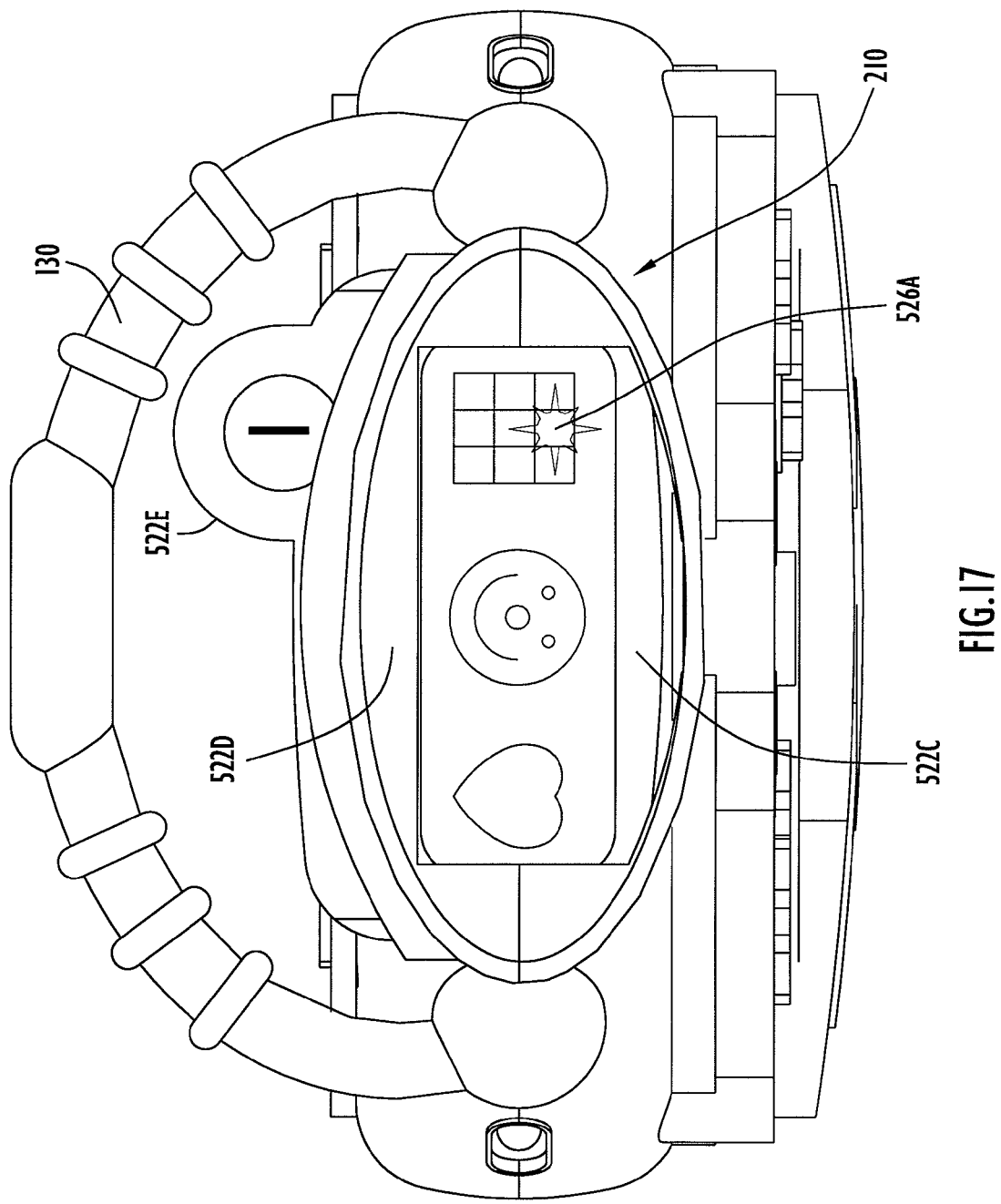
FIGS. 17-19 illustrate top views of the image projection device of FIG. 1 with light shining through different slide image patterns of an image slide.
Figure 18:
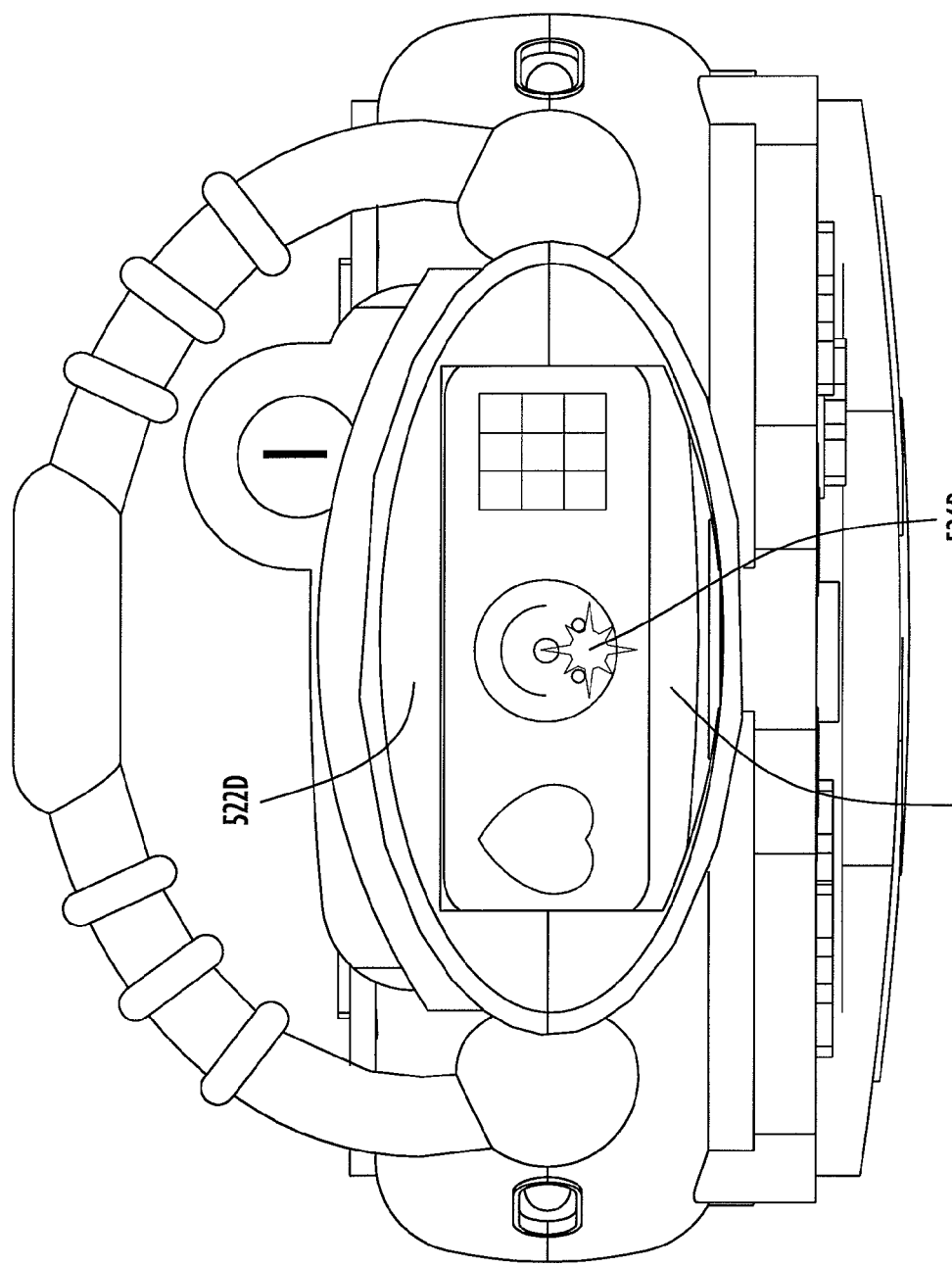
Figure 19:
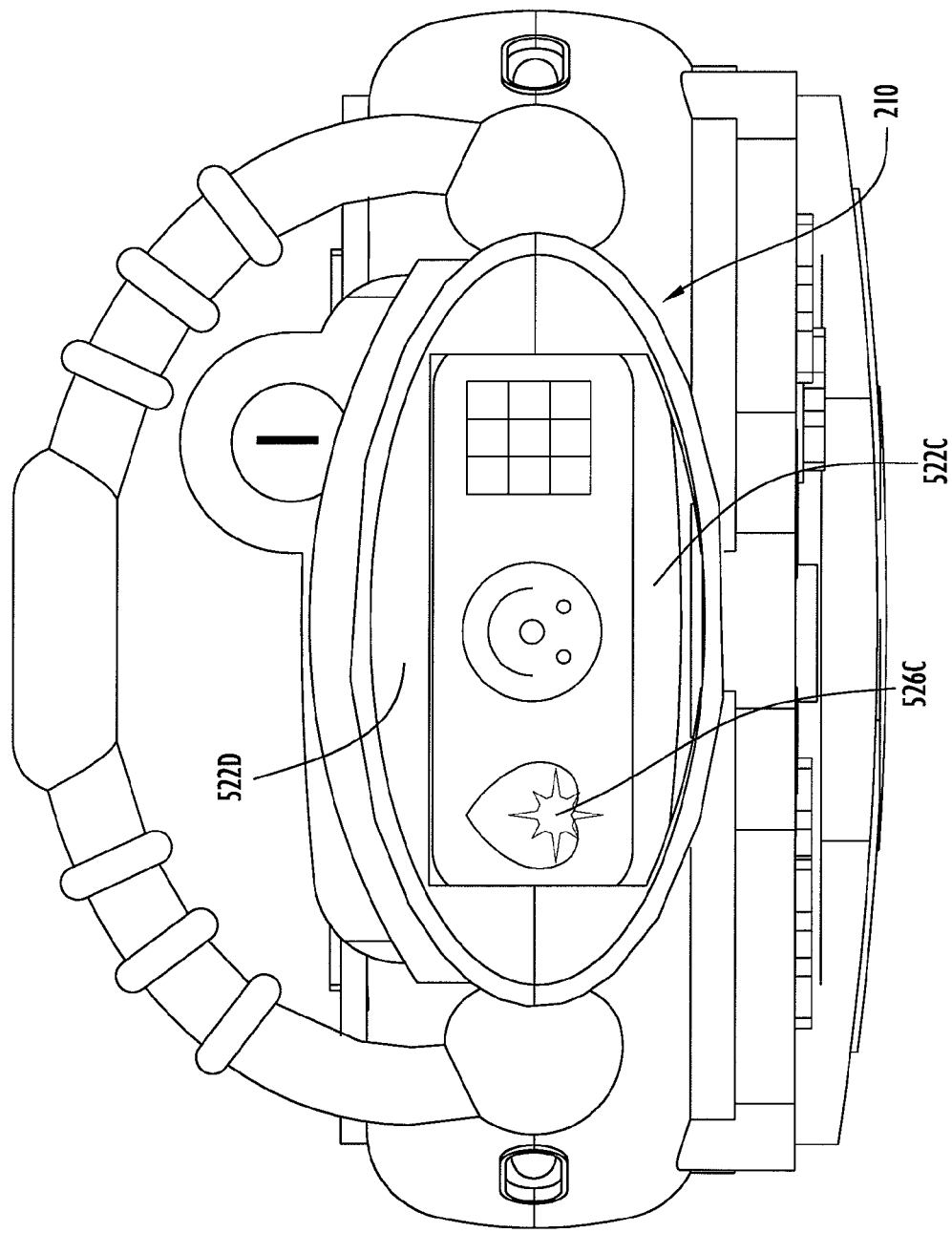

FIGS. 17-19 illustrate top views of the image projection device 100 with different image patterns on the inserted image slide 520 being illuminated. Referring to FIG. 17, image slide 520 is inserted into slide slot 430 with light only shining through slide image pattern 526A. Referring to FIG. 18, light is shining only through slide image pattern 526B. Referring to FIG. 19, light is shining only through slide image pattern 526C.

Referring to FIG. 20, an embodiment of an image viewing surface is illustrated. In this embodiment, an image projecting device 1200 is shown, which may have the same structure as the device 100 previously described. Image projecting device 1200 includes a housing 1210 with an image projecting portion 1230 and a base 1220 supporting the housing 1210. An image viewing surface 1250 which can be a wall, ceiling or other similar surface is shown.

Images 1260, 1262 and 1264 are projected onto the surface 1250. The particular images projected are determined by the pattern of images on the inserted image slide (not shown in FIG. 20). As illustrated, images 1260, 1262 and 1264 overlap and are superimposed on each other. The extent to which the images overlap will be determined by the distance between the image projecting device and the image viewing surface.

The embodiments described above and illustrated in the drawings represent only a few of the many ways of implementing the present invention. For example, the light sources need not be LEDs, but can be any type of light source that generates a sufficient illumination. Furthermore, any number of light chambers and light sources may be used. Moreover, any number of light sources may be disposed in a light chamber.

In various embodiments, the electronics assembly may include any number of or combination of sensors, switches, lights, speakers, animated members, motors, and sensory output generating devices. The microprocessor unit may produce any combination of audio and visual effects including, but not limited to, animation, lights, and sound (music, speech, and sound effects). The output pattern is not limited to that which is discussed herein and includes any pattern of music, lights, and/or sound effects. The electronics assembly may also include additional switches or sensors to provide additional sensory output activation without departing from the scope of the present invention.

Thus, it is intended that the present invention cover the modifications and variations of this invention that come within the scope of the appended claims and their equivalents. For example, it is to be understood that terms such as: left, right, top, bottom, front, rear, upper, lower, first, second, inner, outer, side, height, length, width, interior, and exterior as may be used, and merely describe points of reference and do not limit the present invention to any particular orientation or configuration.

We claim:

1. An image projection system comprising:
    a housing,
    a plurality of light sources, and
    at least one image slide, each of the at least one image slides having multiple, separated, slide image patterns, each slide image pattern being in a different location on the at least one image slide,
    wherein each of the plurality of light sources project through an associated one of the slide image patterns to form a separate viewing image pattern on a viewing surface, and wherein the image projection system further includes a control system operable to individually control each of the plurality of light sources such that an illuminated intensity of the light sources is selectively varied to cause a corresponding variation in an illuminated intensity of the viewing image pattern.

2. The image projection system of claim 1, wherein the control system is an electronic control system mounted within the housing.

3. The image projection system of claim 2, wherein the electronic control system also controls the timing of illumination of each of the light sources.

4. The image projection system of claim 1, wherein when each of the light sources is simultaneously illuminated, the slide image patterns are superimposed on the viewing surface.

5. The image projection system of claim 1, wherein each of the light sources comprises at least one LED.

6. The image projection system of claim 5, wherein the LEDs collectively project light of multiple colors.

7. The image projection system of claim 5, wherein each of the LEDs has an illuminated intensity and wherein the illuminated intensity of each LED is controlled by an electronic control system within the housing.

8. The image projection system of claim 1, wherein the housing further includes a guide wall separating each of the light sources to both direct light from a particular one of the light sources to a particular slide image pattern on the image slide and to prevent the mixing of light from each of the light sources within the housing.

9. The image projection system of claim 1, wherein the at least one image slide is removable from the housing.

10. The image projection system of claim 2, wherein the at least one image slide contains an identity portion which is discernable by the electronic control system, and the identity portion contains slide-specific information and the electronic control system produces slide-specific audio output.

11. The image projection system of claim 1, wherein the illuminated intensity of the light sources is varied such that one light source possesses different illumination intensity than another light source during illumination of the light sources.

12. An image projection system comprising:
    a base;
    a housing pivotally mounted to the base, the housing including a plurality of light sources; and
    at least one removable image slide, each image slide having multiple, separated, slide image patterns, wherein each slide image pattern is disposed in a different location on the at least one removable image slide,
    wherein the plurality of light sources are individually controlled and illuminated such that one light of the plurality projects through only one of the separated slide image patterns at a time, thereby forming a separate viewing image pattern on the surface.

13. The image projection system of claim 12, wherein:
    the plurality of light sources comprises at least one LED; and
    the at least one LED has an illuminated intensity controlled by an electronic control system mounted within the housing.

14. The image projection system of claim 13, wherein the electronic control system also controls timing of illumination of the at least one LED.

15. The image projection system of claim 12, wherein:
    the plurality of light sources comprises a plurality of LEDs; and
    the housing further includes a guide wall separating each of the plurality of light sources to both direct light from a particular one of the plurality of light sources to a particular slide image pattern on the removable image slide and to prevent the mixing of light from each of the plurality of light sources within the housing.

16. The image projection system of claim 12, wherein the at least one removable image slide contains an identity portion which is discernable by an electronic control system within the housing, wherein the identity portion contains slide-specific information and the electronic control system produces slide-specific audio output.

17. An image projection system comprising:
    a housing including a light source, at least one removable image slide, each removable image slide containing an identity portion which is discernable by an electronic control system within the housing, the light source being positioned to project light through the at least one removable image slide onto a viewing surface, wherein the identity portion contains slide-specific information and in response to the slide-specific information, the electronic control system produces slide-specific audio output and slide-specific intensity and timing of the light projected by the light source onto the at least one removable slide.

18. The image projection system of claim 17, wherein each of the at least one removable image slides has multiple, separated, slide image patterns, each slide image pattern being in a different location on the at least one removable image slide, the light source including at least one LED projecting through only one of the slide image patterns on the at least one removable image slide onto a viewing surface to form a separate viewing image pattern on the surface.

19. The image projection system of claim 18, wherein the light source includes a plurality of LEDs, wherein when the LEDs are simultaneously illuminated, the slide image patterns are superimposed on each other on the viewing surface.

20. An image projection system comprising:
a housing including a plurality of light sources and at least one image slide, each of the at least one image slides having multiple, separated, slide image patterns, and each slide image pattern being in a different location on the at least one image slides, each of the plurality of light sources projecting through only one of the slide image patterns on the at least one image slide onto a viewing surface to each form a separate viewing image pattern on the surface,
wherein the housing further includes a guide wall separating each of the light sources to both direct light from a particular one of the light sources to a particular slide image pattern on the image slide and to prevent the mixing of light from each of the light sources within the housing.

* * * * *